US012011724B2

(12) United States Patent
Carpenter et al.

(10) Patent No.: US 12,011,724 B2
(45) Date of Patent: Jun. 18, 2024

(54) SHREDDER FOR COMMINUTING BULK MATERIAL

(71) Applicant: Vermeer Manufacturing Company, Pella, IA (US)

(72) Inventors: Clark David Carpenter, Barnes City, IA (US); Keith Leon Roozeboom, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 17/748,758

(22) Filed: May 19, 2022

(65) Prior Publication Data

US 2022/0401961 A1 Dec. 22, 2022

Related U.S. Application Data

(60) Provisional application No. 63/212,850, filed on Jun. 21, 2021.

(51) Int. Cl.
*B02C 18/14* (2006.01)
*B02C 18/16* (2006.01)
(Continued)

(52) U.S. Cl.
CPC ............ *B02C 18/145* (2013.01); *B02C 18/18* (2013.01); *B02C 2018/162* (2013.01)

(58) Field of Classification Search
CPC . B02C 18/145; B02C 18/18; B02C 2018/162; B02C 2018/188; B02C 21/02
See application file for complete search history.

(56) References Cited

U.S. PATENT DOCUMENTS 4,205,799 A * 6/1980 Brewer ................. B02C 18/184 241/DIG. 31
7,552,883 B2 6/2009 Kinnunen et al.
(Continued)

FOREIGN PATENT DOCUMENTS

DE 202011103859 U1 10/2012
WO WO-2019226888 A1 * 11/2019 ......... B02C 18/0084

OTHER PUBLICATIONS

Extended Search Report issued from the European Patent Office for related Application No. 22173949.3 dated Nov. 18, 2022 (7 Pages).
(Continued)

*Primary Examiner* — Matthew Katcoff
*Assistant Examiner* — Mohammed S. Alawadi
(74) *Attorney, Agent, or Firm* — Michael Best & Friedrich LLP

(57) ABSTRACT

A shredder includes a shredder box and a shredder rotor positioned within an interior of the shredder box. The shredder rotor is rotatable about a rotor axis and has a plurality of rotor teeth. An access door is pivotally moveable between an open position and a closed position, the access door defining a side wall of the shredder box when in the closed position. A shredder comb is positioned at an interior side of the access door and includes a plurality of shredder comb teeth. When the access door is in the closed position, the shredder comb is positioned at a shredding location to intermesh with the plurality of rotor teeth for shredding material input to the shredder box. The plurality of shredder comb teeth are removable and reversible for use in two orientations.

21 Claims, 23 Drawing Sheets

(51) Int. Cl.
*B02C 18/18* (2006.01)
*B02C 18/22* (2006.01)

(56) References Cited

U.S. PATENT DOCUMENTS

| | | | | |
|---|---|---|---|---|
| 7,909,277 | B2 | 3/2011 | Doppstadt et al. | |
| 8,979,010 | B2 | 3/2015 | Doppstadt et al. | |
| 9,573,137 | B2 | 2/2017 | Van Der Galien | |
| 10,632,474 | B2 | 4/2020 | Doppstadt et al. | |
| 2003/0061926 | A1* | 4/2003 | Sotsky | B02C 18/148 83/495 |
| 2003/0075628 | A1 | 4/2003 | Pretzler et al. | |
| 2007/0194161 | A1* | 8/2007 | Doppstadt | B02C 18/145 241/294 |
| 2007/0257145 | A1 | 11/2007 | Kinnunen et al. | |
| 2014/0103152 | A1* | 4/2014 | Van der Galien | B02C 4/34 241/73 |
| 2015/0217299 | A1 | 8/2015 | Doppstadt | |
| 2017/0361331 | A1* | 12/2017 | Doppstadt | B02C 23/16 |
| 2020/0070177 | A1 | 3/2020 | Doppstadt | |

OTHER PUBLICATIONS

Notification of European publication number and information for related Application No. 22173949.3 dated Nov. 30, 2022 (2 Pages).

King Kong Tools, Model No. KFS1093-P, website:https://www.kingkong-tools.com/product/786/kfs 1093-p, products on sale or publicly available before Jun. 21, 2021 (2 pages).

King Kong Tools, Model No. KFS1231-P, website:https://www.kingkong-tools.com/product/950/kfs1231-p, products on sale or publicly available before Jun. 21, 2021 (2 pages).

Tana Shark Waste Shredders, Product Literature, Aug. 2016, 20 Pages.

* cited by examiner

SHREDDER FOR COMMINUTING BULK MATERIAL

CROSS-REFERENCE TO RELATED APPLICATIONS

This application claims priority to U.S. Provisional Patent Application No. 63/212,850, filed on Jun. 21, 2021, the entire contents of which are incorporated by reference herein.

BACKGROUND

The present application relates to low-speed shredders for comminuting bulk material. Low-speed shredders are used to reduce the particle size of certain waste products, such as large landfill waste. U.S. Pat. No. 9,573,137, U.S. Patent Publication 2021/0069721, and U.S. Patent Publication 2015/0217299 are examples of such shredders. These shredders are robust machines built with heavy components due to the high loads and forces exerted on the equipment during the shredding process. The waste is often fed from the top of the shredder, typically by dropping the material into a hopper with a front-end loader. The hopper contains the material as a rotor/drum, usually located below the hopper, rotates at a speed that may vary from zero to 40 RPM. The shredder rotor has multiple rigid teeth that engage the waste material and eventually force it through a comb with teeth, which results in a shearing and ripping of the material. The comminuted waste then drops to a conveyor for discharge. A screen may be used between the rotor and the conveyor to control the size of material that is discharged from the shredder. The screen allows smaller particles to pass through while also preventing large particles from passing through and discharging through the conveyor. Large particles that do not pass through the screen are recirculated to the hopper by the rotor for further reduction in size.

Due to the harsh equipment operating conditions, shredder components such as the teeth of the comb will experience wear. For this reason, the comb may be constructed so that comb teeth are individually replaceable.

SUMMARY

One aspect of the present disclosure relates to a low-speed shredder including a shredder box and a shredder rotor positioned within an interior of the shredder box. The shredder rotor is rotatable about a rotor axis and has a plurality of rotor teeth. An access door is pivotally moveable between an open position and a closed position, the access door defining a side wall of the shredder box when in the closed position. A shredder comb is positioned at an interior side of the access door and includes a plurality of shredder comb teeth. When the access door is in the closed position, the shredder comb is positioned at a shredding location to intermesh with the plurality of rotor teeth for shredding material input to the shredder box. The plurality of shredder comb teeth are removable and reversible for use in two orientations.

In another aspect, the present disclosure provides a shredder including a shredder box and a shredder rotor positioned within an interior of the shredder box. The shredder rotor is rotatable about a rotor axis and has a plurality of rotor teeth. An access door is pivotally moveable between an open position and a closed position, the access door defining a side wall of the shredder box when in the closed position. A shredder comb unit is positioned at an interior side of the access door such that, when the access door is in the closed position, a shredder comb of the shredder comb unit comprising a plurality of shredder comb teeth is positioned at a shredding location to intermesh with the plurality of rotor teeth for shredding material input to the shredder box. The shredder comb unit includes a frame on which the plurality of shredder comb teeth are fixedly supported through a corresponding plurality of comb tooth bases that are removable from the frame.

A variety of advantages of the disclosure will be set forth in part in the description that follows, and in part will be apparent from the description, or may be learned by practicing the various aspects of the present disclosure. It is to be understood that both the forgoing general description and the following detailed description are exemplary and explanatory only and are not restrictive of the broad inventive concepts upon which the examples are based.

DETAILED DESCRIPTION

Figure 1:
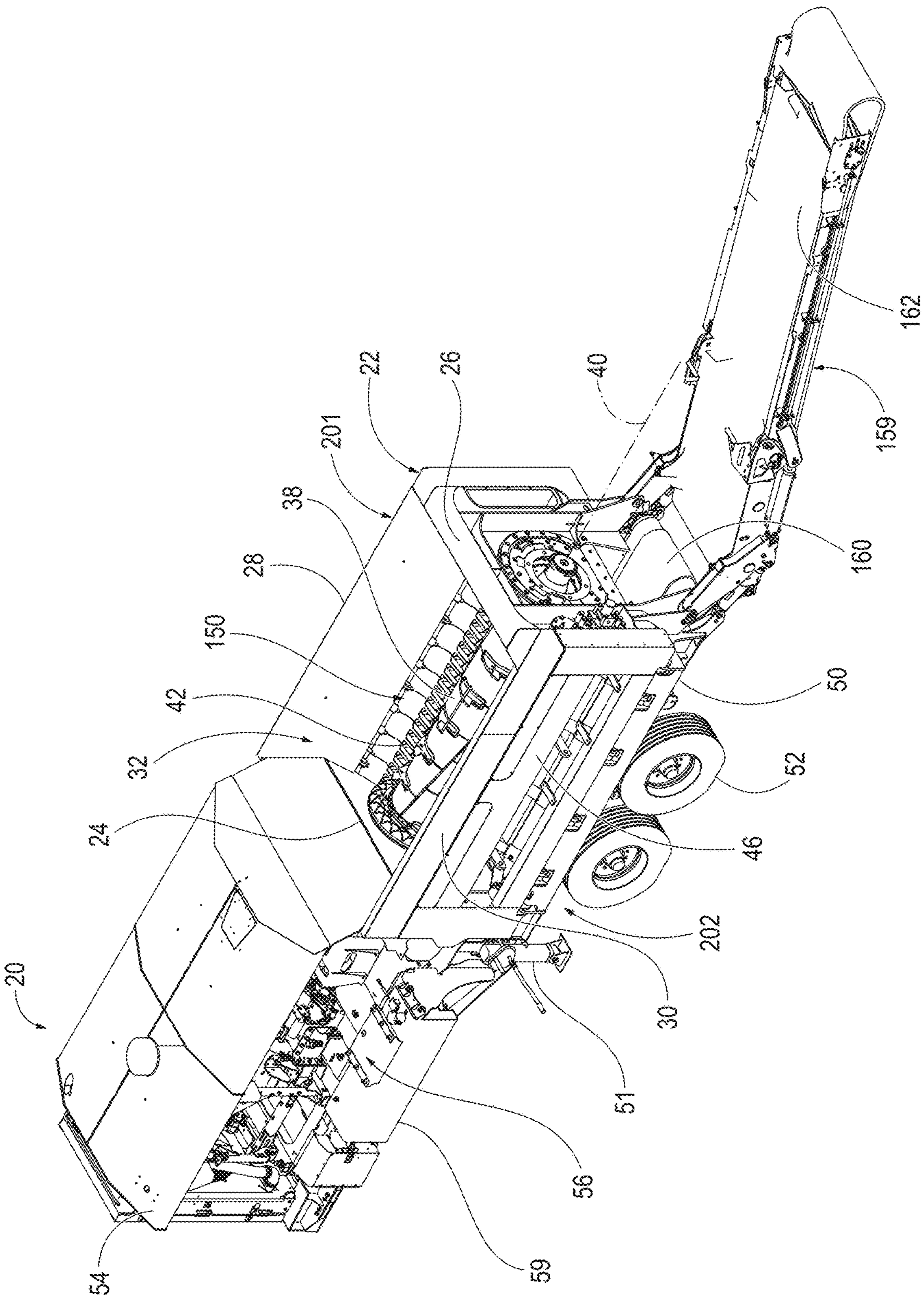
FIG. 1 is a rear, top, left side perspective view of a shredder in accordance with the principles of the present disclosure.
Figure 2:
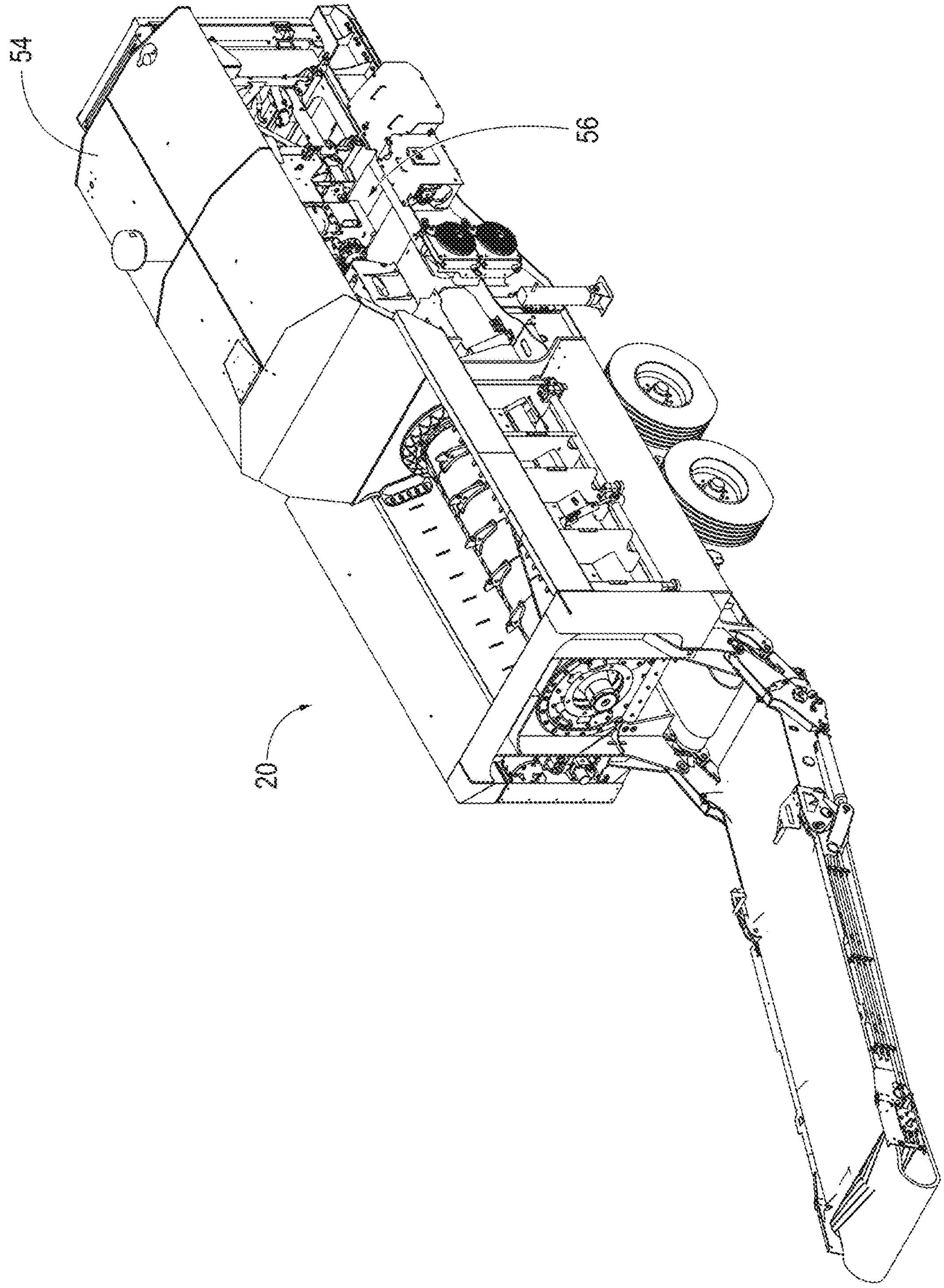
FIG. 2 is a rear, top, right side perspective view of the shredder of FIG. 1.
Figure 3:
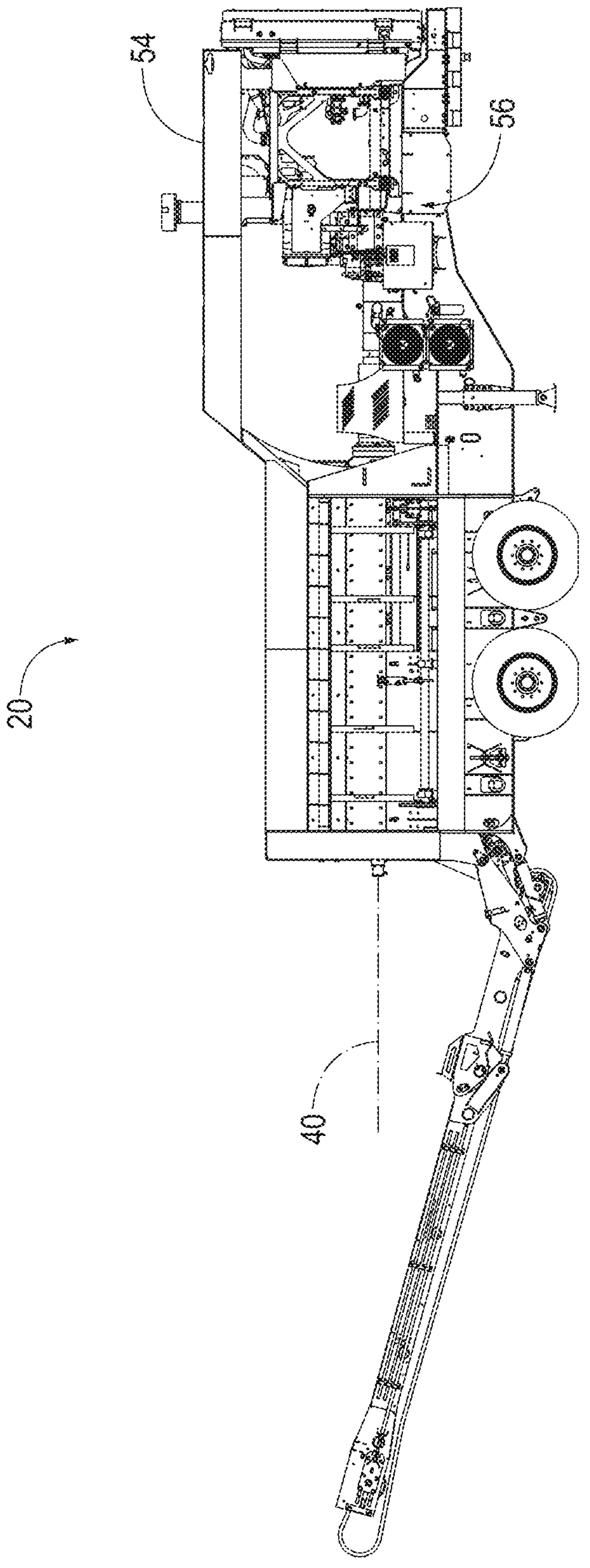
FIG. 3 is a right side view of the shredder of FIG. 1.
Figure 4:
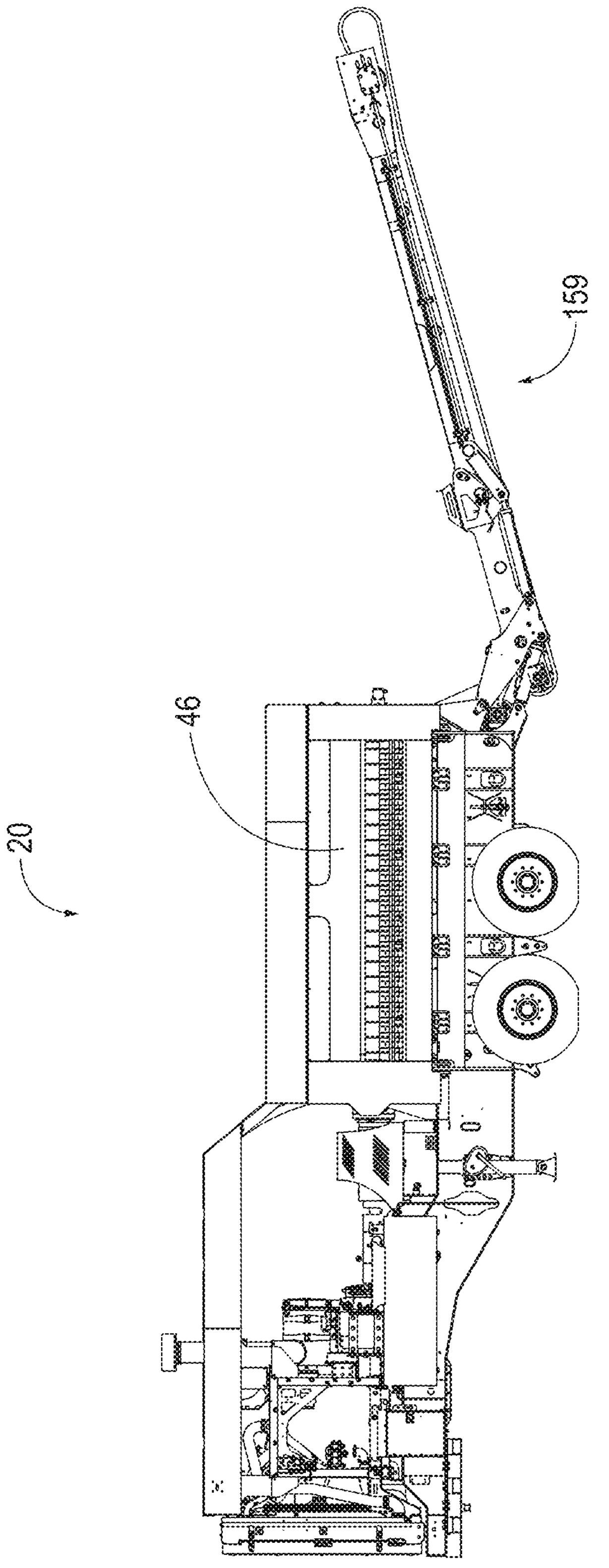
FIG. 4 is a left side view of the shredder of FIG. 1.

Various embodiments will be described in detail with reference to the drawings, wherein like reference numerals represent like parts and assemblies throughout the several views. Additionally, any examples set forth in this specification are not intended to be limiting and merely set forth some of the many possible embodiments for practicing aspects of the present disclosure.

The present invention relates to a shredder 20. In one embodiment, which may be represented by FIG. 1, the shredder 20 may comprise a shredder box 22 including first and second opposite end walls 24, 26, and first and second opposite side walls 28, 30 that extend between the first and second end walls 24, 26. The shredder box 22 also includes an upper hopper 32 for receiving material desired to be shredded. The shredder box 22 may also including a lower discharge opening 33 (FIG. 5), which can cooperate with a chute 34 for discharging shredded material from the shredder box 22. Referring back to FIG. 1, the first and second opposite side walls 28, 30 are located respectively at first and second sides 201, 202 of the shredder box 22.

FIG. 1 shows that the shredder 20 may further comprise a conveyor system 159 that includes a lower conveyor 160 positioned beneath the lower discharge chute 34 and an outer conveyor 162 positioned adjacent to one end of the lower conveyor 160. The outer conveyer 162 may be pivotally movable relative to the shredder box 22 between a stowed or transport position and an operating position. The shredder box 22 may also comprise a base 50 supported on wheels 52. The discharge chute 34 may be part of the shredder box 22, part of the base 50, or may be part of both the shredder box 22 and the base 50. The shredder 20 includes a shredder housing 54 enclosing a power train 56 for rotating the shredder rotor 38. Embodiments may comprise a trailer tongue/hitch 59 at the front of the shredder 20 with support jacks 51.

Figure 5:
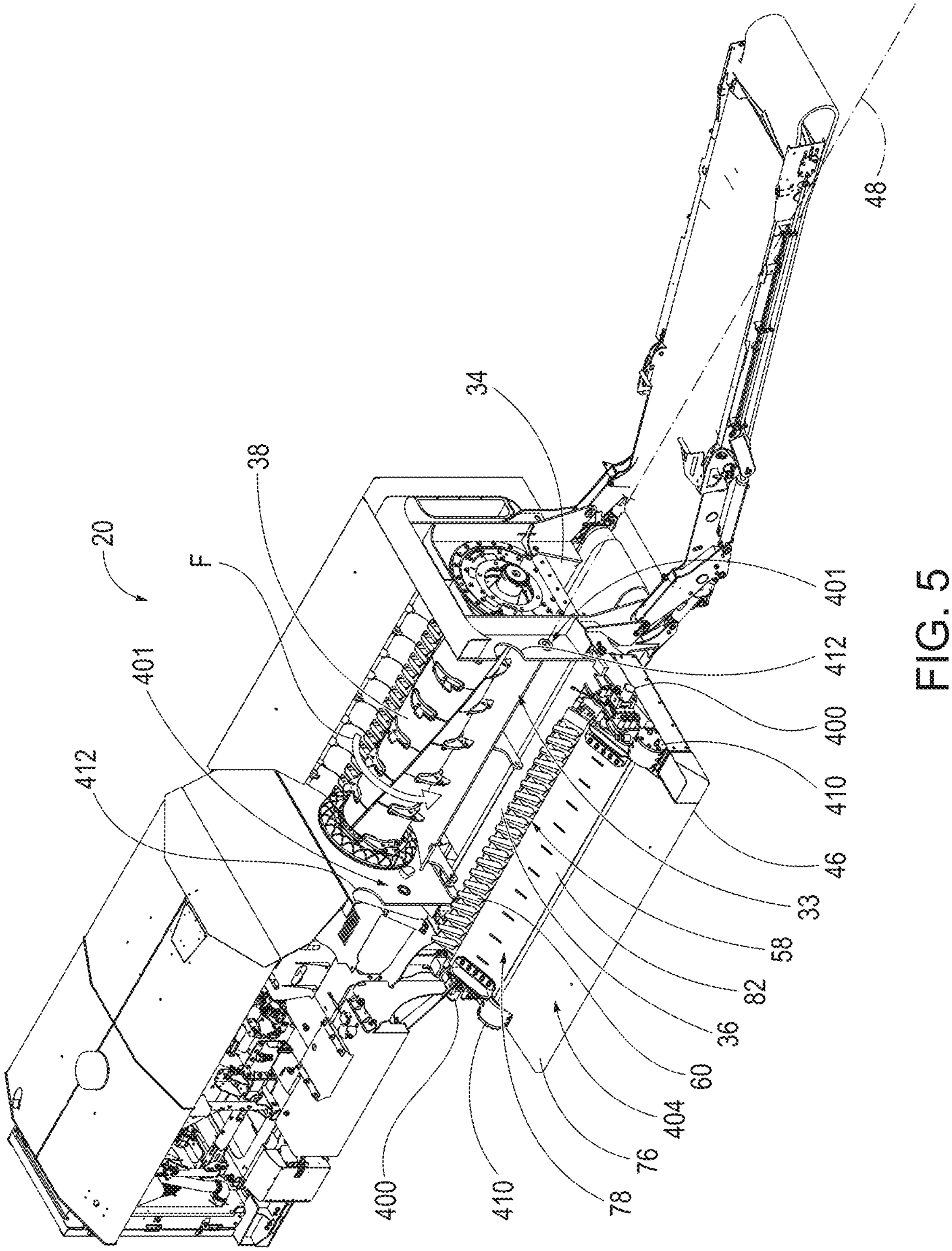
FIG. 5 is a rear, top, left side perspective view of the shredder of FIG. 1 with an access door of the shredder in an open position.

As shown in FIG. 5, the shredder box 22 may further include a service platform 36 that extends between the first and second end walls 24, 26, and a shredder rotor 38 positioned within an interior of the shredder box 22 adjacent a lower end of the upper hopper 32. An access door 46 is moved into a lowered or open position as shown in FIG. 5 to expose the service platform 36. The service platform 36 may be substantially flat (i.e., horizontal) and can enable access to several components of the shredder 20. For example, when an operator is standing on the service platform 36, the operator is able to face a first direction toward the shredder rotor 38, or the operator may face a second direction towards a shredder comb 58, described in more detail below. An operator may access the full length of the shredder comb 58 by walking along the service platform 36. An operator may also access the complete length of the rotor 38 by walking along the service platform 36. On an opposite side from the service platform 36, the shredder 20 includes a flow control comb 150 connected to the first side wall 28. The flow control comb 150 intermeshes with the shredder rotor 38 to prevent material desired to be shredded from moving from the upper hopper 32 downwardly to a region between the shredder rotor 38 and the first side wall 28. The flow control comb 150 also has comb elements that can pivot upwardly relative to the first side wall 28 to allow material to be recirculated by the shredder rotor 38 upwardly past the flow control comb 150 and back into the upper hopper 32.

The shredder rotor 38 may include a main rotor body and a plurality of rotor teeth 42 mounted to the main rotor body. The shredder rotor 38 may be rotatable about a rotor axis 40 that is oriented to extend from the first end wall 24 to the second end wall 26. The first and second side walls 28, 30 are depicted as being oriented to extend in a direction of (i.e., along or parallel to) the rotor axis 40. The shredder rotor 38 may be either or both rotatable in a forward reducing direction F about the rotor axis 40, and rotatable in a reverse direction about the rotor axis 40. Although not shown, the shredder 20 may further comprise a screen unit mountable at a screen mounting location for screening shredded material that moves past the shredder comb 58. The screen mounting location may be located above the lower discharge opening 33 and chute 34 and below the rotor 38.

Figure 6:
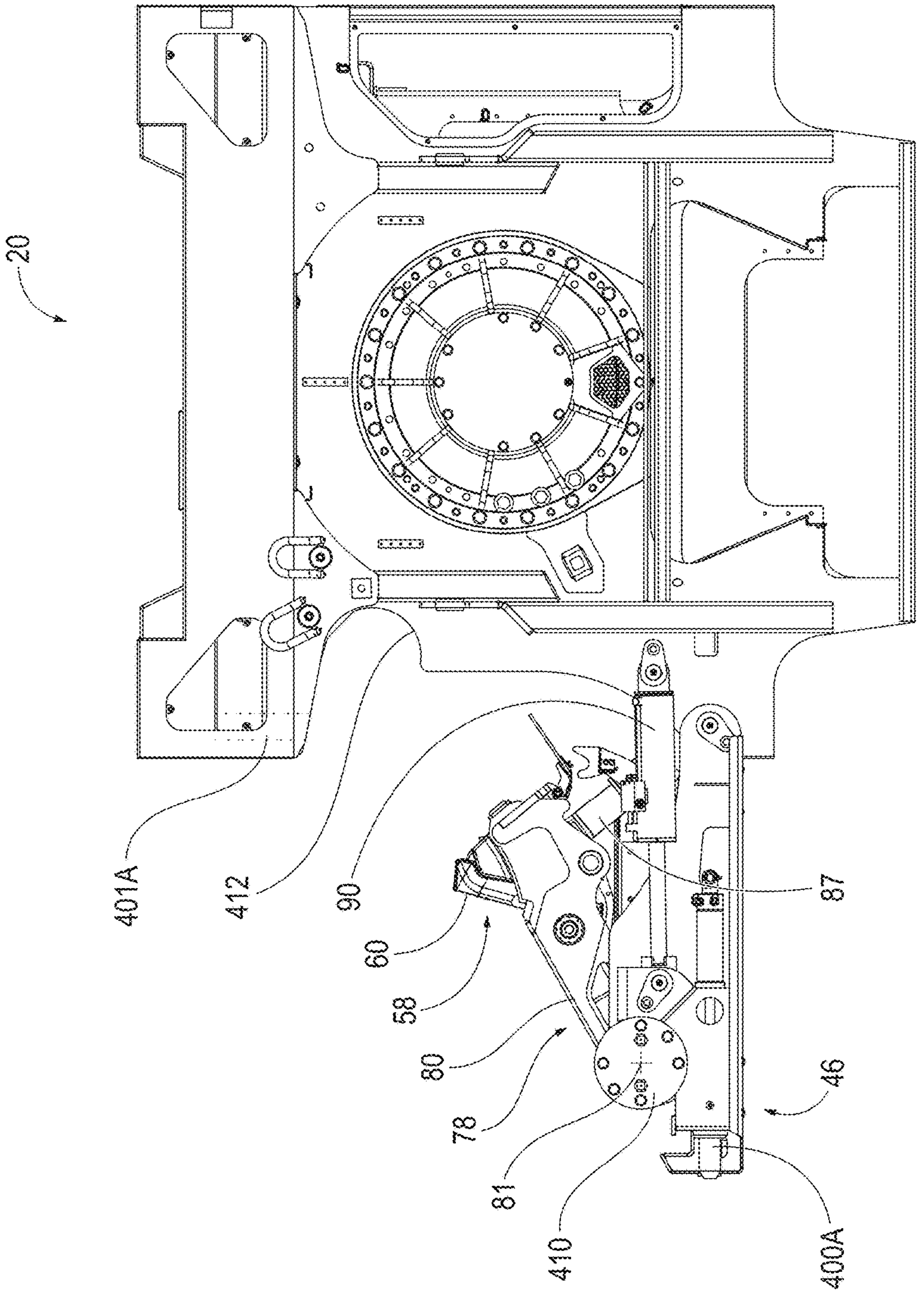
FIG. 6 is a rear view of a portion of the shredder of FIG. 1, showing the access door in the open position.
Figure 7:
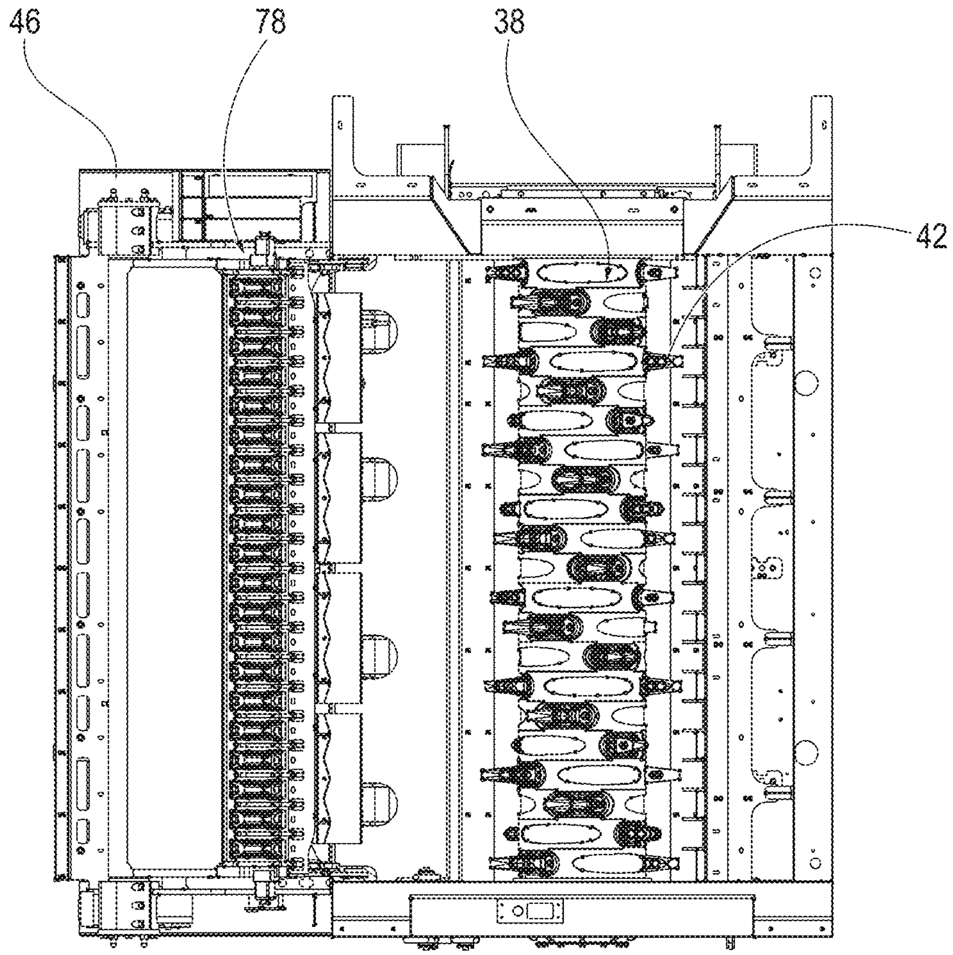
FIG. 7 is a top view of a portion of the shredder of FIG. 1, showing the access door in the open position.

The access door 46 of the shredder is pivotally moveable relative to the first end wall 24, the second end wall 26 and the service platform 36 between an open position (see FIG. 5) and a closed position (see FIG. 1). The access door 46 pivots about a door axis 48 as the access door 46 pivots between the open and closed positions. The door axis 48 extends in a direction of (i.e., along or parallel to) the rotor axis 40 between the first and second end walls 24, 26. The door axis 48 in the illustrated embodiment is horizontal. When it is in the closed position, the access door 46 defines the second side wall 30 of the shredder box 22. The access door 46 may also include first and second latches 400 (FIG. 5) for securing the access door 46 respectively to the first and second end walls 24, 26 when the access door 46 is in the closed position. The latches 400 can interlock with openings 401 in the end walls 24, 26 to secure the door 46 in the closed position. In an example embodiment, the access door 46 is vertical in the closed position and horizontal in the open position. Furthermore, in the embodiment illustrated in FIG. 5 the latches 400, which are formed to include retractable pins, operate in the horizontal direction to extend and retract into the openings 401 in the respective end walls 24, 26. FIG. 6 illustrates the access door 46 having an alternate style of latches 400A that extend into and retract from vertical openings 401A in the end walls 24, 26.

Referring to FIG. 5, the shredder 20 further comprises a shredder comb 58 that may be positioned at an interior side 404 of the access door 46. The shredder comb 58 may be carried with the access door 46 as the access door 46 is pivoted between the open and closed positions. The shredder comb 58 includes shredder comb teeth 60. When the access door 46 is in the closed position, the shredder comb 58 is positioned between the first and second end walls 24, 26 at a shredding location adjacent the lower end of the upper hopper 32. In some embodiments, the shredder comb 58 is configured to cooperate with the shredder rotor 38 to shred material from the upper hopper 32. The shredder comb 58 may be positionable in a shredding position (see FIG. 8) where the comb teeth 60 intermesh with the rotor teeth 42, and wherein the comb teeth 60 are located inside a cylindrical reference boundary of the shredder rotor 38, as defined below. The shredder comb 58 may also be positioned, with the access door 46 closed, in a relief position (not shown) in which the comb teeth 60 are outside the cylindrical reference boundary. The cylindrical reference boundary can be defined by the swept dimension of the rotor teeth 42 of the shredder rotor 38 as rotated about the rotor axis 40. In some embodiments, the rotor axis 40 may be positioned higher than the service platform 36.

Figure 8:
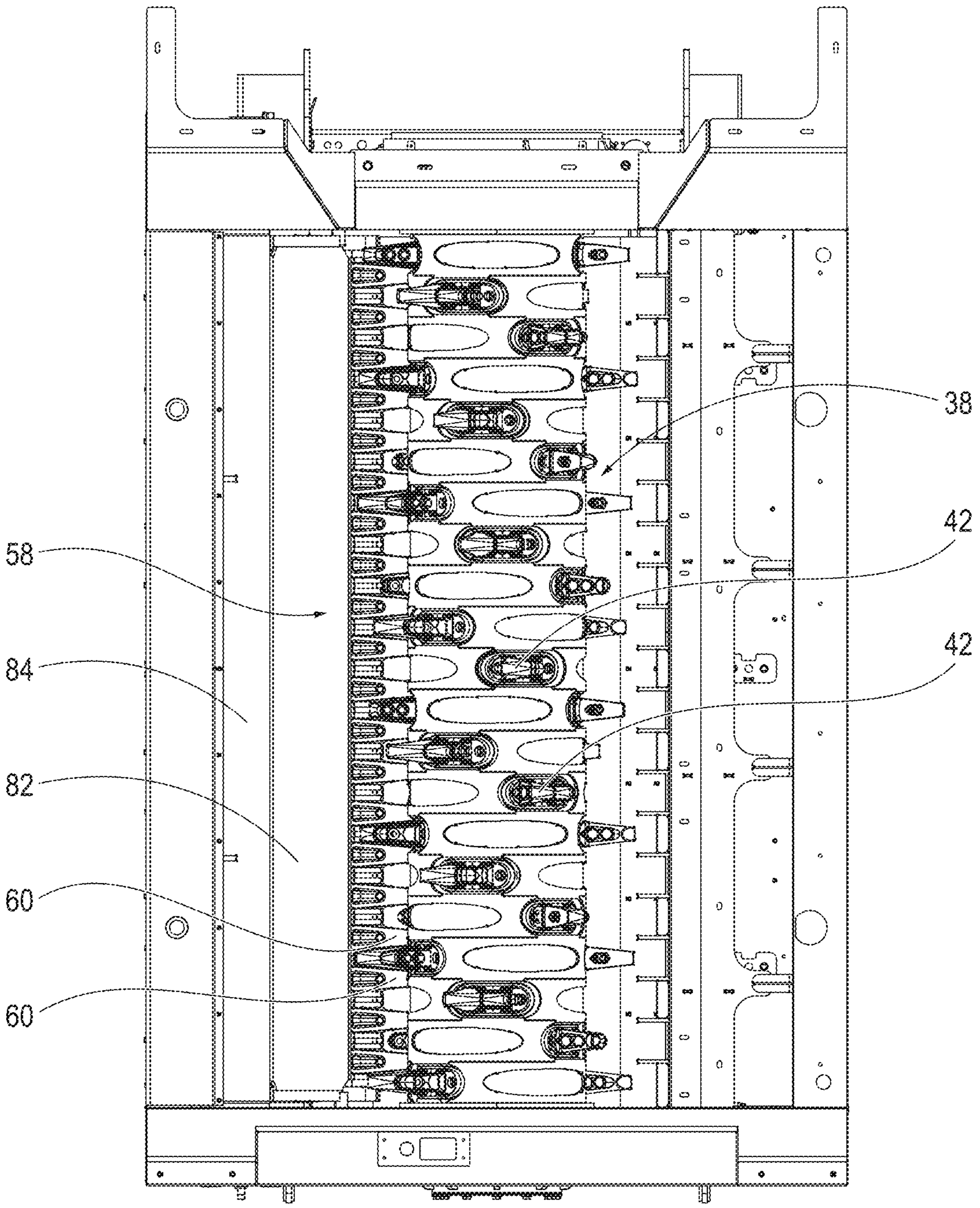
FIG. 8 is a top view of a portion of the shredder of FIG. 1, showing the access door in the closed position.

When the shredder comb 58 is at the shredding position, the shredder comb teeth 60 can cooperate with the rotor teeth 42 to shred the material desired to be shredded when the shredder rotor 38 is rotated about the rotor axis 40. In contrast, when the access door 46 is in the open position, the shredder comb 58 is displaced laterally outwardly from between the first and second end walls 24, 26 to a shredder comb service location outside the interior of the shredder box 22. FIGS. 5 to 14 illustrate that the shredder comb 58 is part of a shredder comb unit 78 carried by the access door 46. The shredder comb unit 78 includes a shredder comb unit frame 80 to which the shredder comb teeth 60 are mounted. The shredder comb unit 78 may be pivotally moveable about an axis 81 (FIG. 6) relative to a support frame of the access door 46 between the shredding and relief positions. The axis 81 can be parallel to the rotor axis 40. To allow for pivotal movement of the shredder comb unit 78, the frame 80 can include pivot shafts that are supported within bearings enclosed within bearing housings 410 (see FIG. 5) mounted to the frame of the door 46. When the door 46 is closed, the bearing housings 410 fit within corresponding notches 412 defined by the end walls 24, 26 of the shredder box. As shown in FIGS. 5 and 8, the shredder comb unit 78 may also include a first plate structure 82 supported by the shredder comb unit frame 80 above the shredder comb 58. The first plate structure 82 defines a lower portion of the hopper defining surface 76. The access door 46 may also include a second plate structure 84 fixed relative to the support frame of the access door 46. The second plate structure 84 defines an upper portion of the hopper defining surface 76.

When the access door 46 is closed and the shredder comb 58 is at the shredding location, the shredder comb teeth 60 may be positioned inside the cylindrical reference boundary of the shredder rotor 38 when the shredder comb unit 78 is in the shredding position. The shredder comb teeth 60 may be located outside the cylindrical reference boundary of the shredder rotor 38 when the shredder comb unit 78 is in the relief position. As shown in FIG. 6, the shredder 20 may also comprise at least one hydraulic cylinder 87 for holding the shredder comb unit 78 in the shredding position. The hydraulic cylinder(s) 87 can be configured to retract to allow the shredder comb unit 78 to move from the shredding position to the relief position. One or more additional hydraulic cylinders 90 are configured to move the access door 46 from a closed position to an open service position and vice versa.

Figure 9:
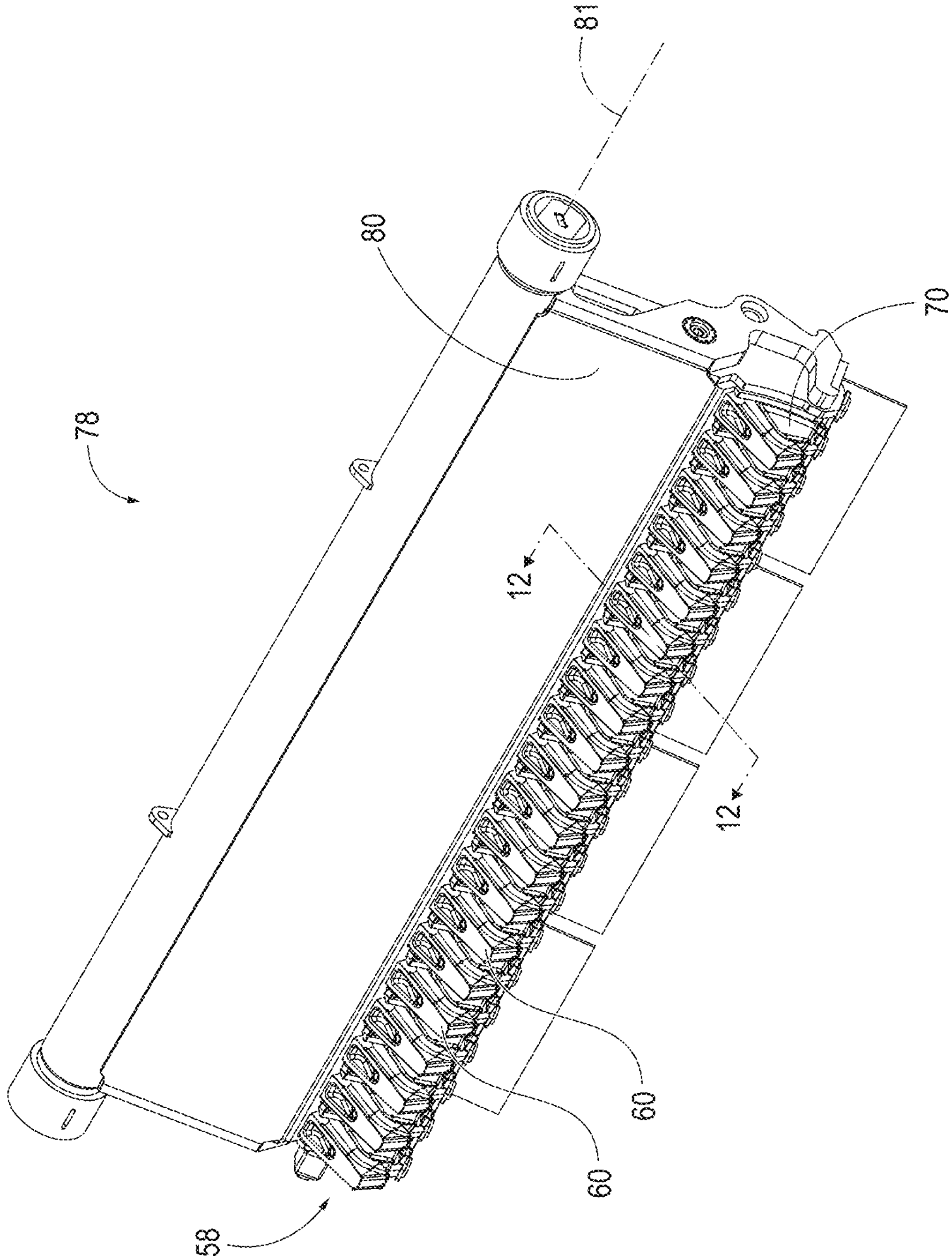
FIG. 9 is a perspective view of the comb assembly of the shredder of FIG. 1, taken from the working side.
Figure 10:
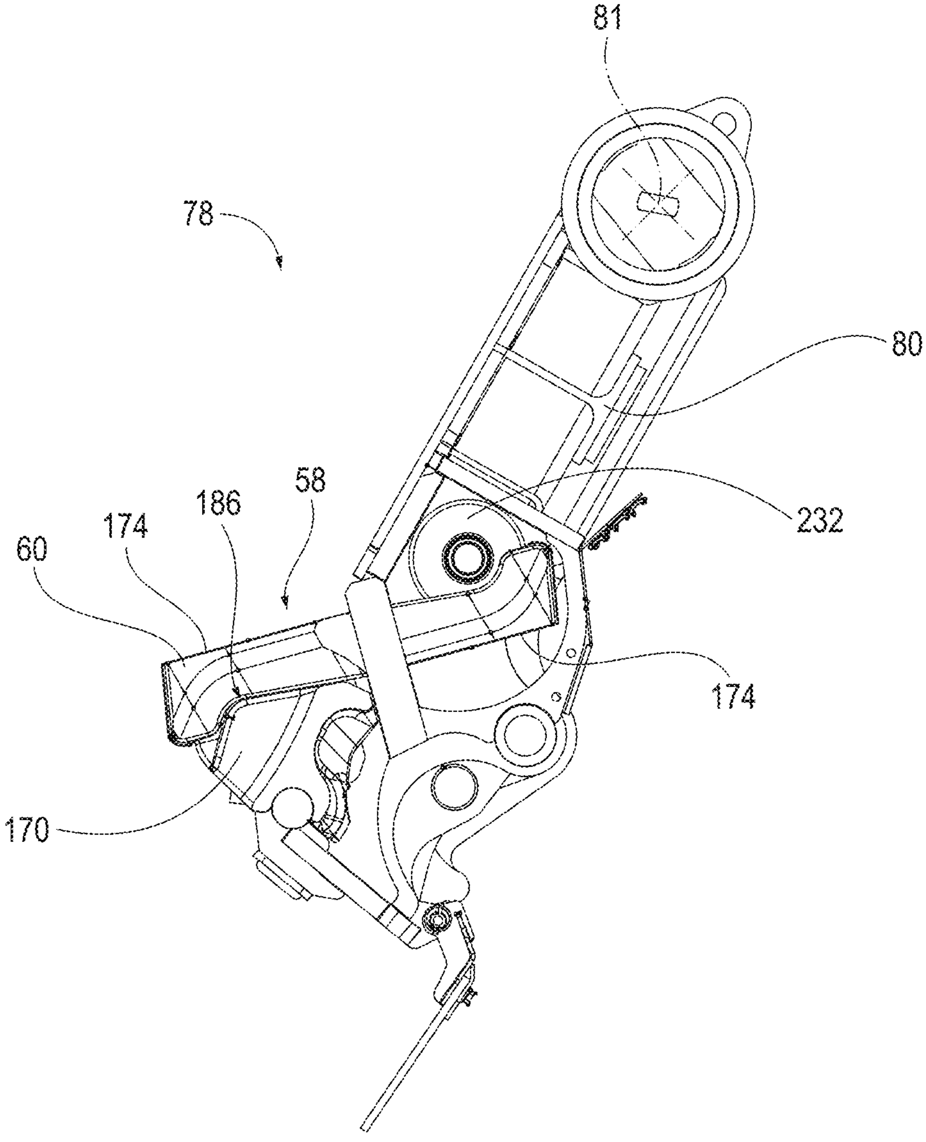
FIG. 10 is a front end view of the comb assembly of FIG. 9 with portions removed to better illustrate a removable, reversible comb tooth.
Figure 11:
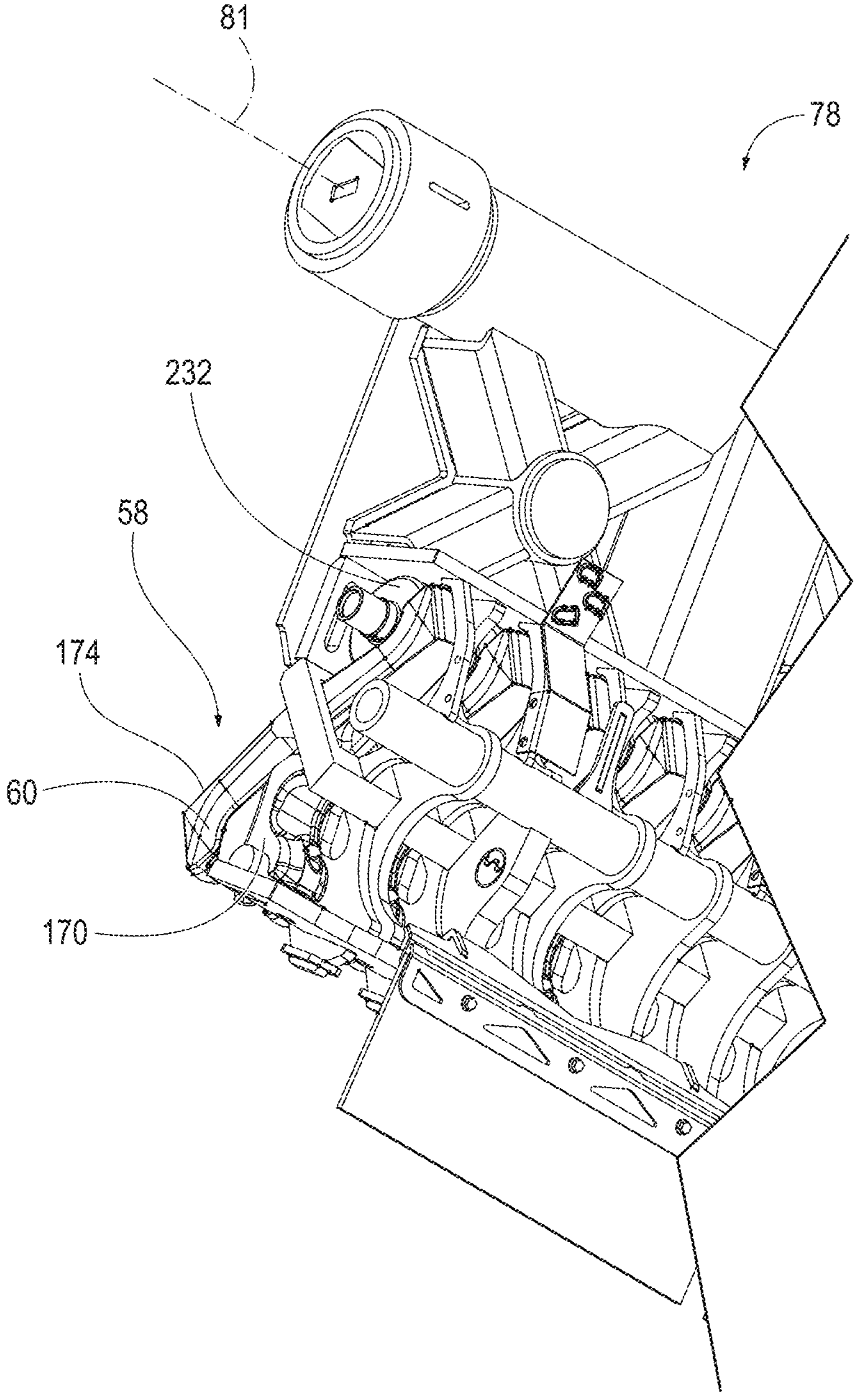
FIG. 11 is perspective view of the comb assembly of the shredder of FIG. 9, taken from the non-working side, with portions removed similar to FIG. 10.

The construction and assembly of the comb teeth 60 to the shredder comb unit 78 to form the comb 58 is described here with reference to FIGS. 9 to 25. As shown in FIG. 9, a row of comb teeth 60 are provided, each individually mounted to the frame 80 of the shredder comb unit 78. Thus, the comb teeth 60 are individually replaceable on the comb unit 78. As described in further detail below, each comb tooth 60 is configured to be mounted in two different orientations, rendering the comb teeth 60 reversible for use in two different orientations. Rather than mounting directly to the frame 80, each comb tooth 60 is supported by a comb tooth mount or base 170, one of which can be seen in the foreground of FIG. 9. The comb tooth base 170 is also shown individually in FIGS. 19 to 25. The working end of each comb tooth 60 has a top side that faces the oncoming rotor teeth 42, and a bottom side that interface with the comb tooth base 170. The working end is the portion of the comb tooth 60 that projects out from an operative side of the frame 80 and is exposed to intermesh with the rotor teeth 42 when the shredder comb unit 78 is in the shredding position with the access door 46 closed (working ends shown in FIG. 9 and left side of FIG. 10). As described below, each mounted comb tooth 60 also has a non-working end (right side of FIG. 10) that cannot intermesh with the plurality of rotor teeth 42, regardless of the position of the access door 46 and the shredder comb unit 78 relative to the access door 46. The non-working ends of all the comb teeth 60 extend to a non-operative side of the frame 80 and are shielded from the shredder box interior by the frame 80 as shown in FIGS. 10-13. The working and non-working ends are determined by how the comb tooth 60 is mounted to the frame 80. As such, reorientation of a comb tooth 60 can reverse which end is the working end and which end is the non-working end. The working and non-working ends of the comb tooth 60 can be identical to each other in physical construction. As such, separate labels are not given for the working and non-working ends, so as to avoid confusion.

Figure 12:
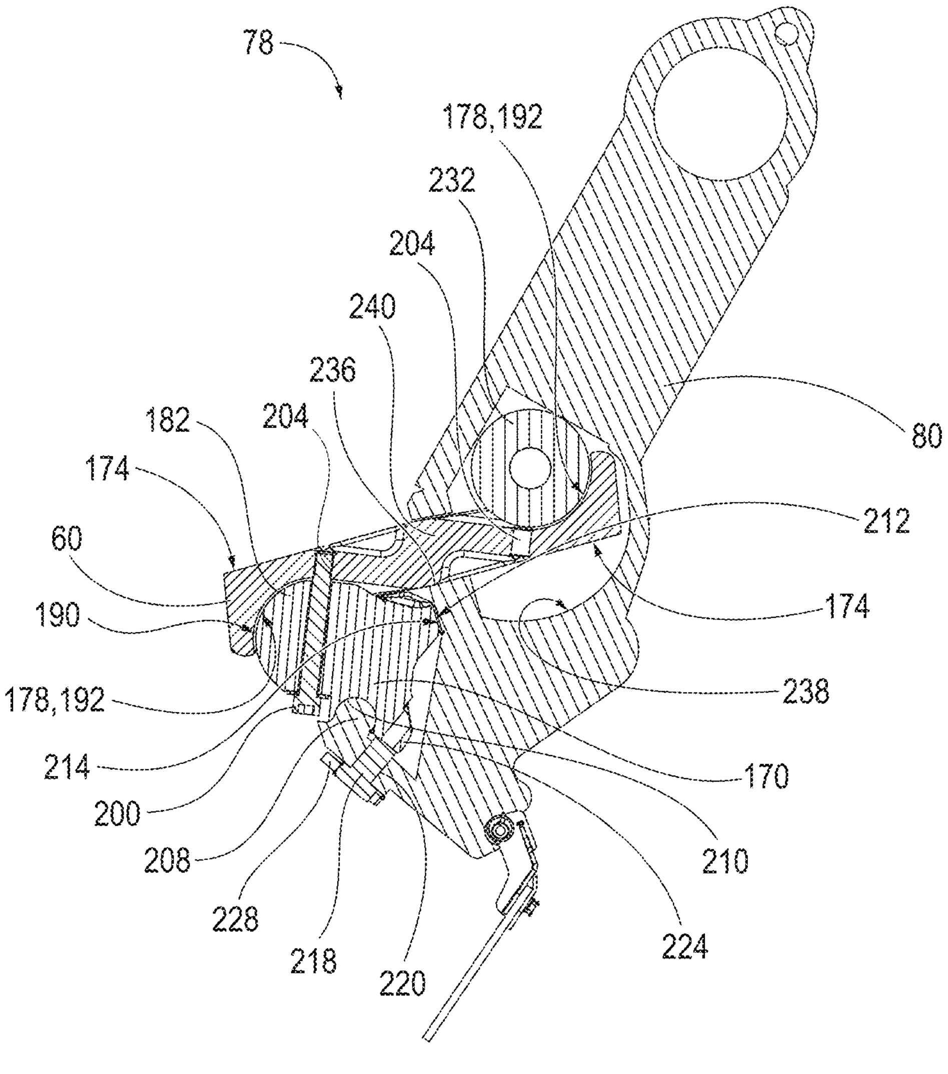
FIG. 12 is a cross-section view taken along section line 12-12 of FIG. 9.
Figure 13:
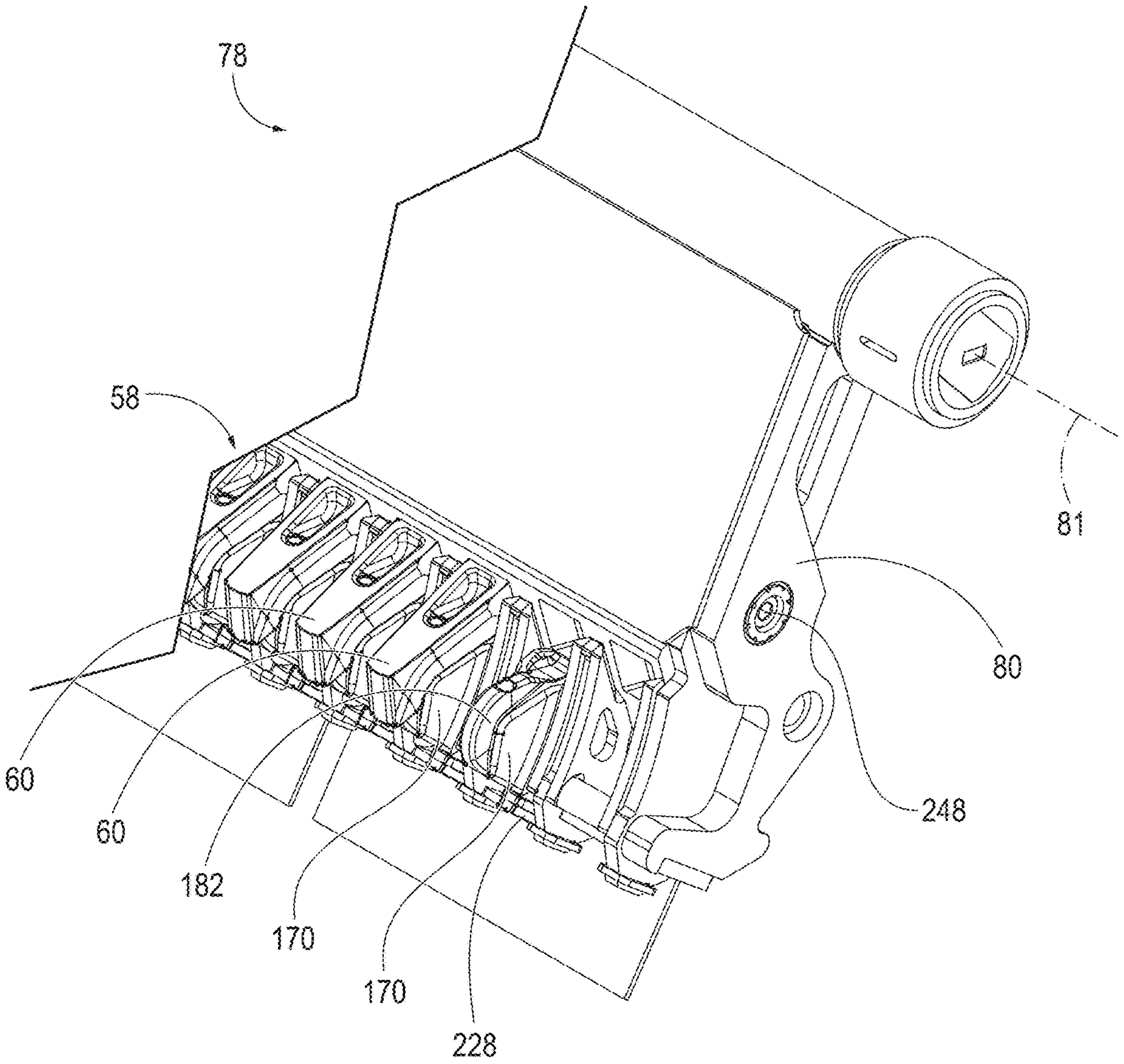
FIG. 13 is a detail perspective view of the comb showing, from left to right, several mounted comb teeth, a tooth base having a comb tooth removed therefrom, and a frame receptacle having a tooth base removed therefrom.
Figure 14:
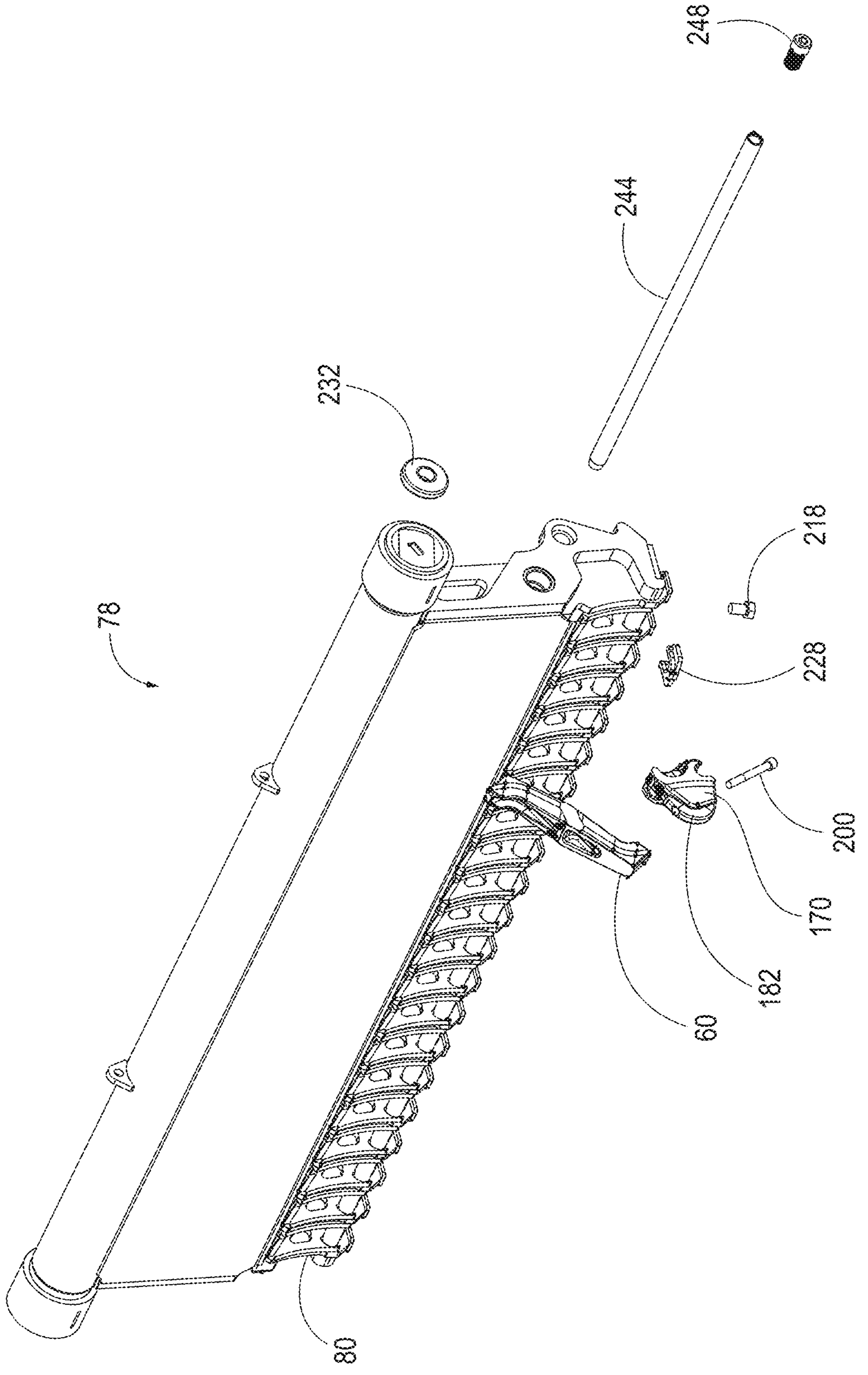
FIG. 14 is an exploded perspective view including a comb frame, a single comb tooth, and associated mounting hardware.
Figure 15:
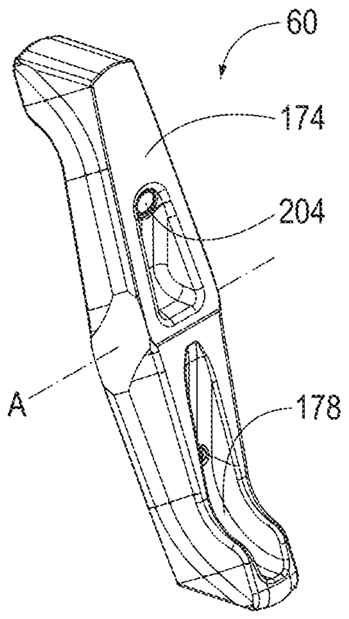
FIG. 15 is a perspective view of a comb tooth according to an embodiment of the present disclosure.
Figure 16:
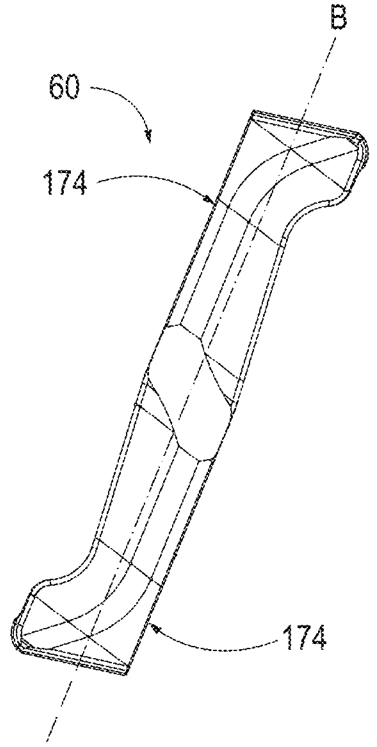
FIG. 16 is a side view of the comb tooth of FIG. 15.
Figure 17:
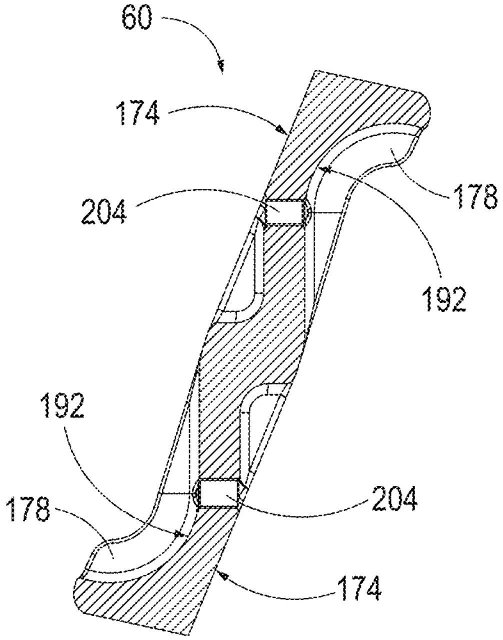
FIG. 17 is a cross-sectional view of the comb tooth taken along line 17-1 of FIG. 18.
Figure 18:
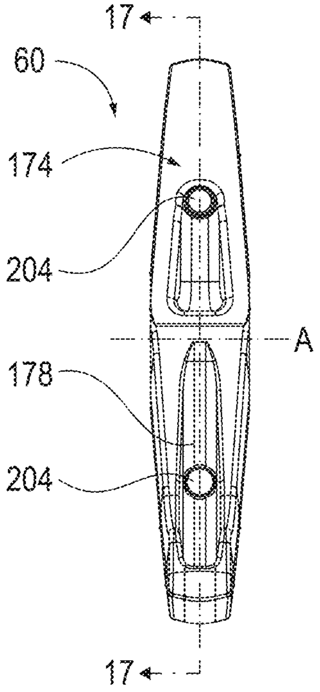
FIG. 18 is a top view of the comb tooth of FIG. 15.
Figure 20:
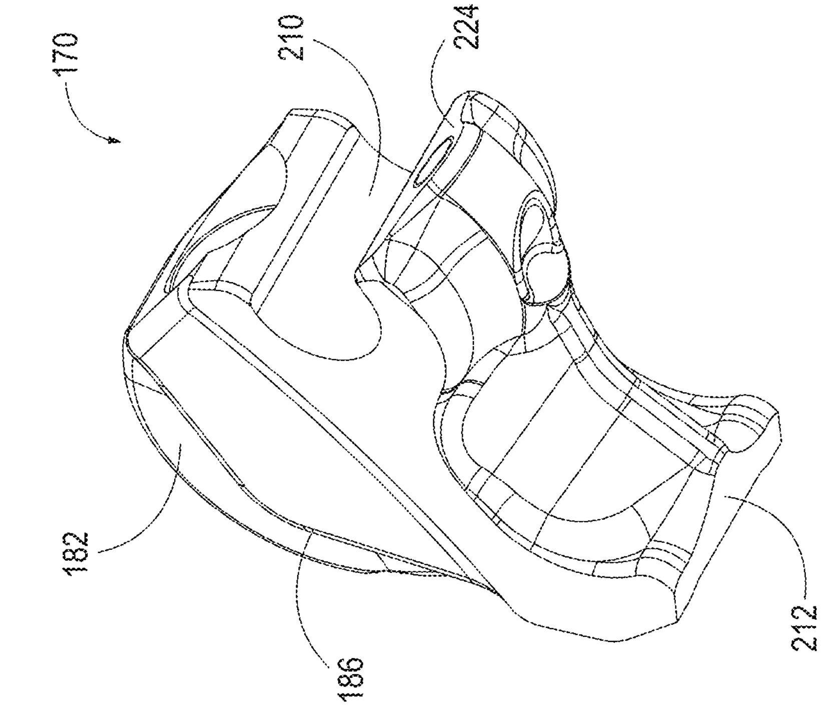
FIG. 20 is a second perspective view of the comb tooth base of FIG. 19.
Figure 19:
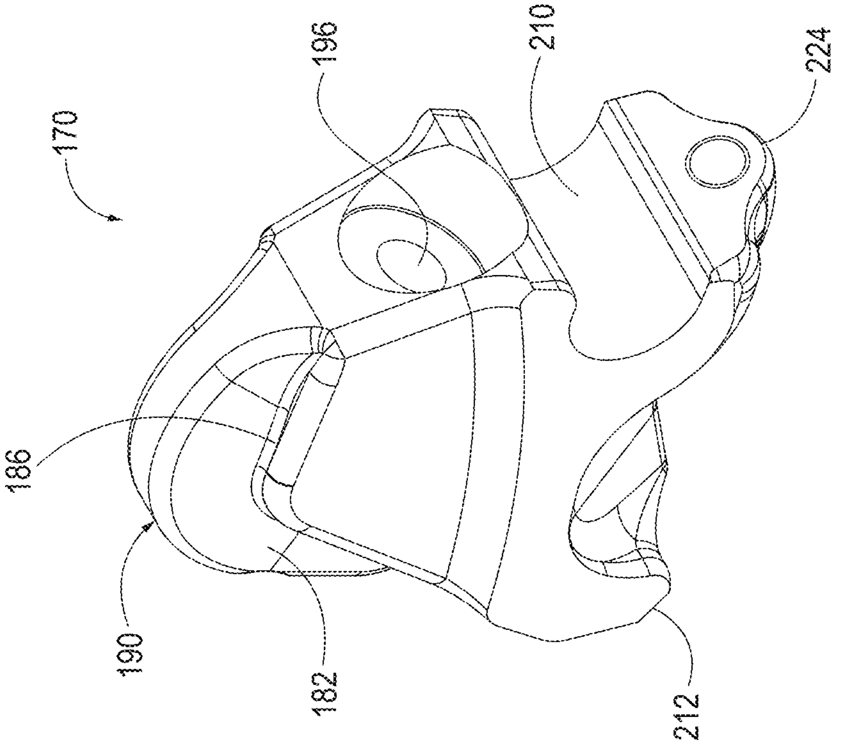
FIG. 19 is a first perspective view of a comb tooth base.
Figure 21:
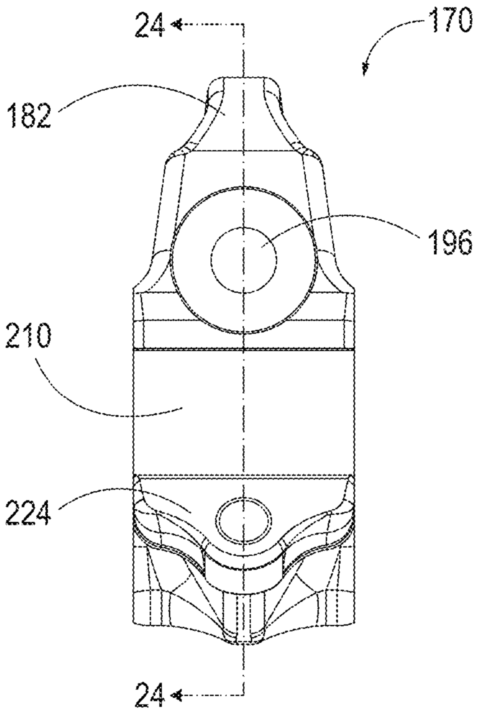
FIG. 21 is a bottom view of the comb tooth base looking straight through a primary fastener hole for comb tooth mounting.
Figure 22:
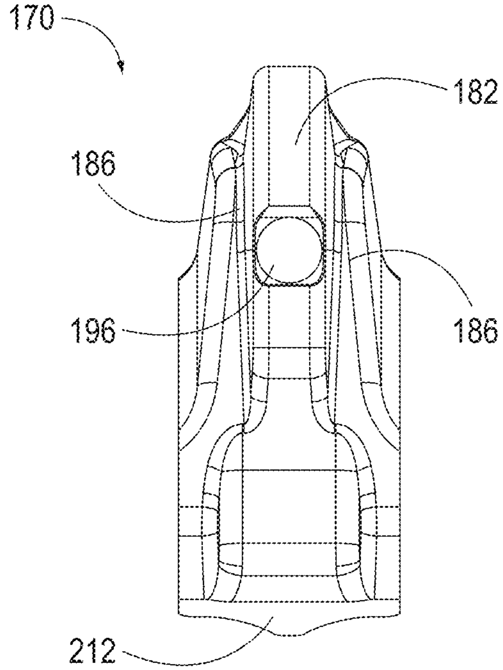
FIG. 22 is a top view of the comb tooth base.
Figure 23:
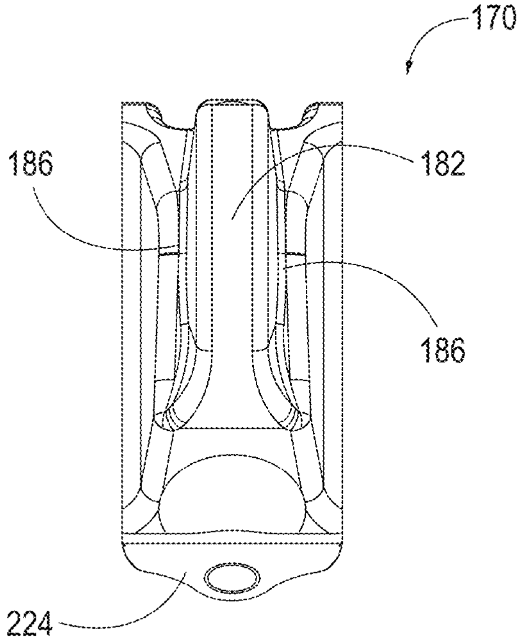
FIG. 23 is a front view of the comb tooth base.
Figure 24:
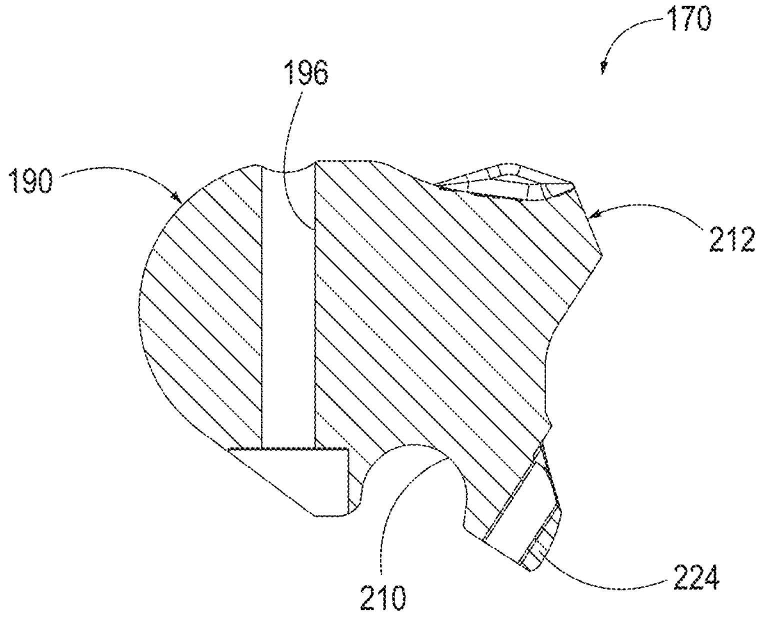
FIG. 24 is a cross-sectional view of the comb tooth base taken along line 24-24 of FIG. 21.
Figure 25:
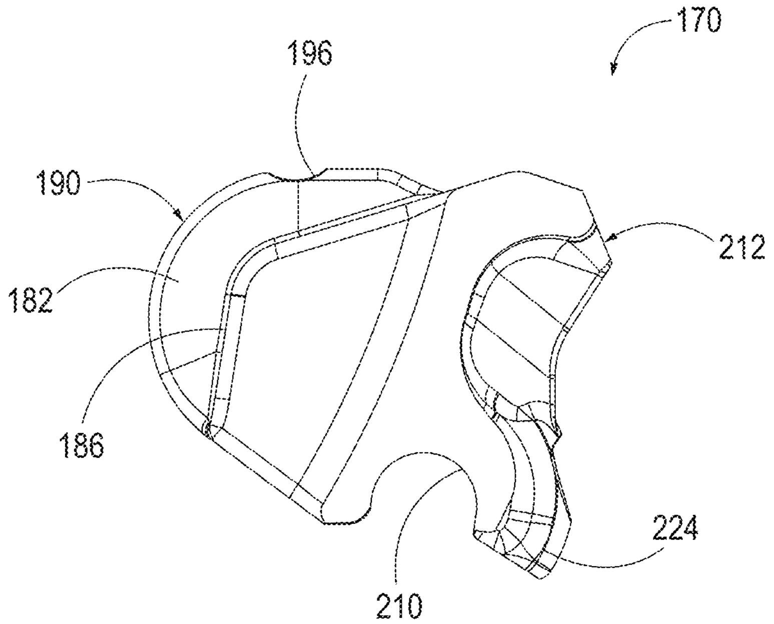
FIG. 25 is a side view of the comb tooth base.

At the top side, the working end of the comb tooth 60 provides a cutting portion 174 defined at least in part by one or more cutting edges. At the bottom side of the working end, the comb tooth 60 can define a pocket 178 (FIG. 12) that receives a central projecting portion 182 of the comb tooth base 170. The central projecting portion 182 can have a reduced thickness compared to the surrounding portions of the comb tooth base 170. As such, additional lateral support surfaces 186 can be formed on the comb tooth base 170 at respective steps where the central projecting portion 182 meets the main body of the comb tooth base 170. The surfaces 186 at these steps can support portions of the comb tooth 60 that extend alongside the pocket 178. In a side view as shown in FIGS. 12 and 25, the central projecting portion 182 can present an arcuate convex interface surface 190 that complements an arcuate concave interface surface 192 formed in the pocket 178 of the comb tooth 60. Both surfaces 190, 192 can optionally have a portion of at least 90 degrees that follows a constant radius. The constant radius section can extend to a top end of a primary fastener hole 196 that is used to accommodate a fastener 200 that secures the comb tooth 60 to the base 170. The fastener 200 can extend from a bottom of the hole 196 up through the top of the hole 196 before threading into a threaded hole 204 in the comb tooth 60 as shown in FIG. 12. The hole 196 can be a clearance hole for the fastener 200.

Although the fastener 200 can be tightened into tension to bring the comb tooth 60 and the base 170 together at the interface surfaces 190, 192, the fastener 200 is not configured to bear the cutting loads presented by the rotating drum teeth 42 driving material across the comb teeth 60. Rather, the fastener 200 is relatively isolated from the cutting loads after being tightened to bring the interface surfaces 190, 192 tightly together. For reasons addressed further below, in spite of the fastener 200 being isolated from the cutting loads, the sum points of contact between the comb tooth 60 and the base 170 do not have a positive locking effect on their own accord. Rather, when taken by themselves, the interface surfaces 190, 192 can be fully mated by simply bringing the comb tooth 60 and the base 170 straight together and can be separated from full mate by simply drawing them apart. Although the interface surfaces 190, 192 can define a tapered or wedge profile, their shapes do not necessitate multi-step orientation such as a specific rotation of one part to the other.

Loads imparted to the comb tooth 60 are transmitted to the base 170, and from the base 170 to the frame 80 of the comb unit 78. The frame 80 can be constructed as a single integral weldment for supporting all the comb teeth 60 of the comb unit 78. As shown in FIG. 12, the comb tooth base 170 can have three separate points of engagement or support with the frame 80. A first point of contact can be established between a rounded knob 208 of the frame 80 and a complementary receptacle or pocket 210 formed in the bottom of the base 170, adjacent the side of the fastener hole 196 that is remote from the comb tooth 60. A second point of contact is defined between an inward end surface 212 (e.g., formed flat) and an adjacent reaction surface 214 (e.g., also formed flat) on the frame 80. Additionally, a threaded fastener 218 is engaged with a threaded hole 220 in the frame 80 such that the end of the fastener 218 presses against a foot portion 224 of the comb tooth base 170. Although shown with an aperture (for optionally receiving a threaded fastener in threaded engagement), the foot portion 224 of the illustrated embodiment is configured in the illustrated construction to receive a pushing force from the fastener 218 as the fastener is threaded into the frame hole 220. This action ensures the take up of any clearance in the other points of contact between the frame 80 and the base 170 so that loads can be efficiently transmitted to the frame 80 and wear reduced. The fastener 218 can have a fine thread pitch to enable fine tuning of the pushing force resulting from turning the fastener 218. A retainer 228 can slide into position in a channel of the frame 80 to engage a head of the fastener 218 to prevent it from rotating and backing out once assembled, as the fastener 218 has a relatively small length-to-diameter ratio and thus, relatively few complete thread turns of engagement. The fastener 218 of the illustrated construction may be referred to as a "pushbolt" as it only pushes on the comb tooth base 170, without extending into or through the comb tooth base 170.

With further reference to FIGS. 10-12 and 14, each comb tooth 60 is additionally supported relative to the frame at a position spaced away from the comb tooth base 170. The support can be provided by a support member or support "ring" 232 that is separate from the comb tooth base 170 and separate from the frame 80, although fixedly secured thereto. Although FIG. 12 shows very close proximity between a window 236 of the frame 80 and a central portion 240 of the comb tooth 60 that separates the working and non-working ends, clearance is provided between the comb tooth central portion 240 and the window 236 when the comb tooth 60 is mounted in the comb unit 78. A plurality of support rings 232 corresponding to a plurality of respective comb teeth 60 are fixedly secured to the frame 80 by a rod 244 and at least one fastener 248. In the illustrated construction, one rod 244 supports half the support rings 232 of the comb unit 78, and another rod 244 (not shown) supports the other half 232. The support rod 244 can have an end with an internal thread for engagement by the fastener 248, which first extends through a hole in a side plate of the frame 80. The threaded end of the support rod 244 can also be used during assembly/disassembly, e.g., by facilitating engagement with a portable power cylinder that pushes/pulls the support rod 244 into/out of the assembly position. In other constructions, support rings 232 or other components with similar features for supporting the comb teeth 60 are integrally incorporated into the weldment of the frame 80. The support rings 232 can be of a hardened steel construction, e.g., heat treated SAE 4140 steel. Each support ring 232 is formed in a single piece as a full 360-degree revolution about a central axis and aperture.

A portion of the support ring 232 facing the comb tooth 60 on the non-working end is shaped and presented to mimic the central projecting portion 182 of the comb tooth base 170. In other words, the pocket 178 on the non-working end receives at least a portion of the support ring 232 to define a tight interface between the pocket interface surface 192 and an interface surface of the support ring 232, which can have the same shape as the interface surface 190 of the central projecting portion 182 of the comb tooth base 170, complementary to the pocket interface surface 190, each tapered or wedged. Due to the presence of the mounted support ring 232, the comb tooth 60 may be assembled to the comb unit 78 by insertion of the non-working end through the frame window 236 in a first angled position wherein the working end is pivoted away from the tooth base 170 about a first axis A of the comb tooth 60 (and the non-working end is likewise pivoted away from the support ring 232). Once inserted longitudinally, along a second axis B thereof, the comb tooth 60 is pivoted about the first axis A to a second angled position in which the working end pocket 178 is brought toward and onto the tooth base 170 and the non-working end pocket 178 is brought toward and onto the support ring 232. As shown in FIG. 12, a curved guide surface 238 is formed in the comb unit frame 80 as an installation slide for guiding the non-working end of the comb tooth 60 into the mounted position. The fasteners 200, 218 are then installed, followed by the retainer 228 for the second fastener 218. When the second fastener 218 is tightened (e.g., only after torqueing of the fastener 200), it imparts a rotation of the tooth base 170 about the knob 208 (counterclockwise in FIG. 12). This not only brings the inward end surface 212 into contact with the frame 80, but also urges the entire comb tooth 60 slightly outward away from the frame 80 to further secure tight contact and the take-up of clearance in both pockets 178 (with the tooth base 170 and the support ring 232, respectively). The illustrated arrangement enables the pockets 178 at the non-working ends to be pressed into contact with the respective support rings 232, without being fastened. No fasteners are used on the non-working ends of the comb teeth 60.

The portion of the comb that retains the retainers 228 can also be used to retain limiters or other screening attachments to help manage the movement of shredded material below the comb teeth 60. At least one such example is described in further detail below with reference to FIGS. 26 to 32.

As previously mentioned, each mounted comb tooth 60 will have a working end and a non-working end. Initial assembly of the comb unit 78 may be entirely indifferent to which end of the comb tooth 60 is placed as the working end.

In other words, the two cutting portions 174 are of identical physical construction and provide the same shredding performance when used with the rotor teeth 42. Whichever orientation is selected for initial assembly, one of the pockets 178 receives the central projecting portion 182 of the comb tooth base 170, and the opposite pocket 178 receives the support ring 232. As can be appreciated from FIGS. 15-18, 180-degree rotation of the comb tooth 60 about the first axis A results in exactly the same part orientation as the original orientation, despite the two ends swapping positions. Thus, when it is desired to reorient the comb tooth 60 to reverse the working end and non-working ends (e.g., following a useful life of a first one of the cutting portions 174), the original comb tooth mounted orientation and subsequent comb tooth mounted orientation differ by 180 degrees of rotation about the first axis A. When the comb tooth 60 is mounted, the first axis A extends parallel to the axis 81 about which the shredder unit 78 is pivotable on the access door 46. Once moved to the subsequent comb tooth mounted orientation, the original (worn) cutting portion 174 is positioned adjacent to and facing away from the support ring 232. As can be appreciated from FIGS. 12 and 18, the comb tooth 60 includes two fastener holes 204 (e.g., identical fastener holes), both of which are offset from the first axis A. Due to the engagement of the comb tooth 60 with the support ring 232 at the non-working end, only a first one of the holes 204 is utilized in the original or first comb tooth mounted orientation, and only the other one of the holes 204 is utilized in the subsequent or second comb tooth mounted orientation.

Although not illustrated, other embodiments of the comb tooth 60 provide dissimilar cutting portions 174 on the two opposite ends (e.g., differing in one or more of size, shape, and hardness). A comb tooth 60 with dissimilar cutting portions 174 can enable reconfiguration of the comb unit 78 for different materials, such as wood vs. rubber, by reversal of the comb teeth 60. A comb tooth 60 with dissimilar cutting portions 174 may still retain two identical mounting surfaces (e.g., pockets 178) at the two ends so that the comb tooth 60 can mount in the same way, regardless of which one of the cutting portions 174 is presented for use. In some constructions, only one of the cutting portions 174 on the comb tooth 60 is serrated, or the two cutting portions 174 can have dissimilar serration structures. In some constructions, reversing comb teeth 60 with dissimilar cutting portions 174 can reconfigure the comb unit 78 to match different rotor configurations (e.g., rotor tip heights and/or profiles).

Figure 26:
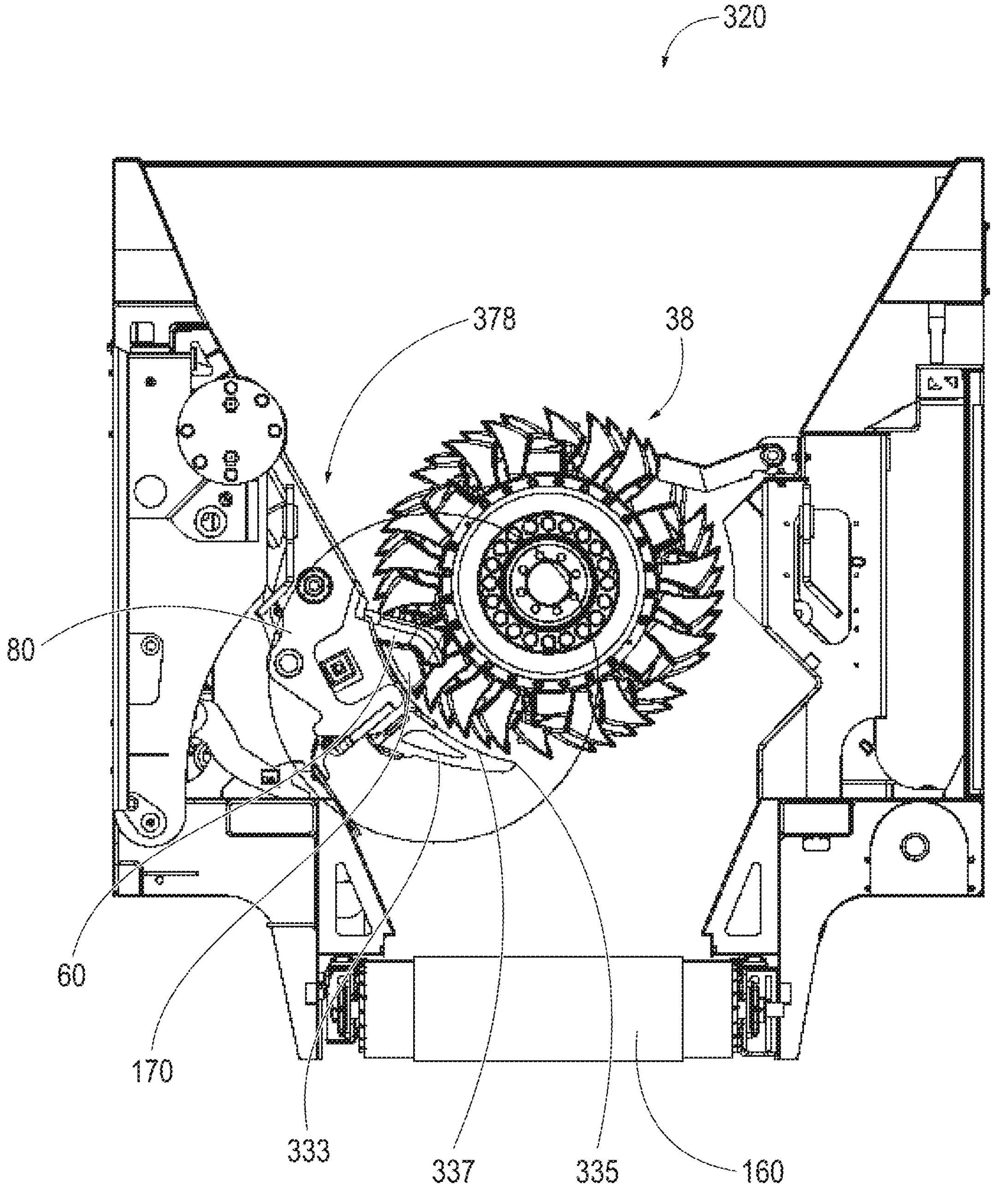
FIG. 26 is a rear view of a shredder in accordance with another embodiment of the present disclosure, an end wall being removed to illustrate the internal components of the rotor and the comb unit. The comb unit generally follows the principles of the preceding embodiment and additionally includes a plurality of removable limiters extending below the comb teeth.

FIGS. 26 to 32 illustrate a shredder 320 of another embodiment, which can be similar to the shredder 20 in any or all aspects except those expressly noted herein. In some embodiments, the shredder 320 of FIGS. 26 to 32 can be a modification or reconfiguration of the same shredder 20, although it is also contemplated that they are completely separate shredders. Similarly, the comb unit 378 can be an entirely different component from the comb unit 78 or a mere reconfiguration thereof, including a group of added and/or exchanged components. As shown in FIG. 26, the comb unit 378 includes a plurality of limiters 333 extending at least partially below the rotor 38. In some circumstances, the limiters 333 can facilitate more complete breakup of the shredded material prior to passage to the conveyor 160 and/or reduce the likelihood of shards or splinters being driven down into the conveyor 160. The limiters 333 can promote deflection and in some cases further break-up of shredded material after the material passes the interface point between the rotor teeth 42 and comb teeth 60. The limiters 333 can be configured in some cases to extend further across the width of the shredder box 22, e.g., a majority thereof, and/or cooperate with additional limiters or screens to promote full recirculation of shredded material to a top side of the rotor 38 above the comb teeth 60. The limiters 333 can be particularly beneficial in shredding railroad ties and other long splintering types of wood, although they can be used in any desired application that may benefit from better sizing. In general, screens and limiters are used to improve material sizing, but limiters are less restrictive since they do not wrap as far around the underside of the rotor 38. Although the illustrated limiters 333 are positioned to remain completely outside the cylindrical reference boundary of the shredder rotor 38, similar limiters can be provided with a profile that extends across and into the cylindrical reference boundary of the shredder rotor 38.

Figure 27:
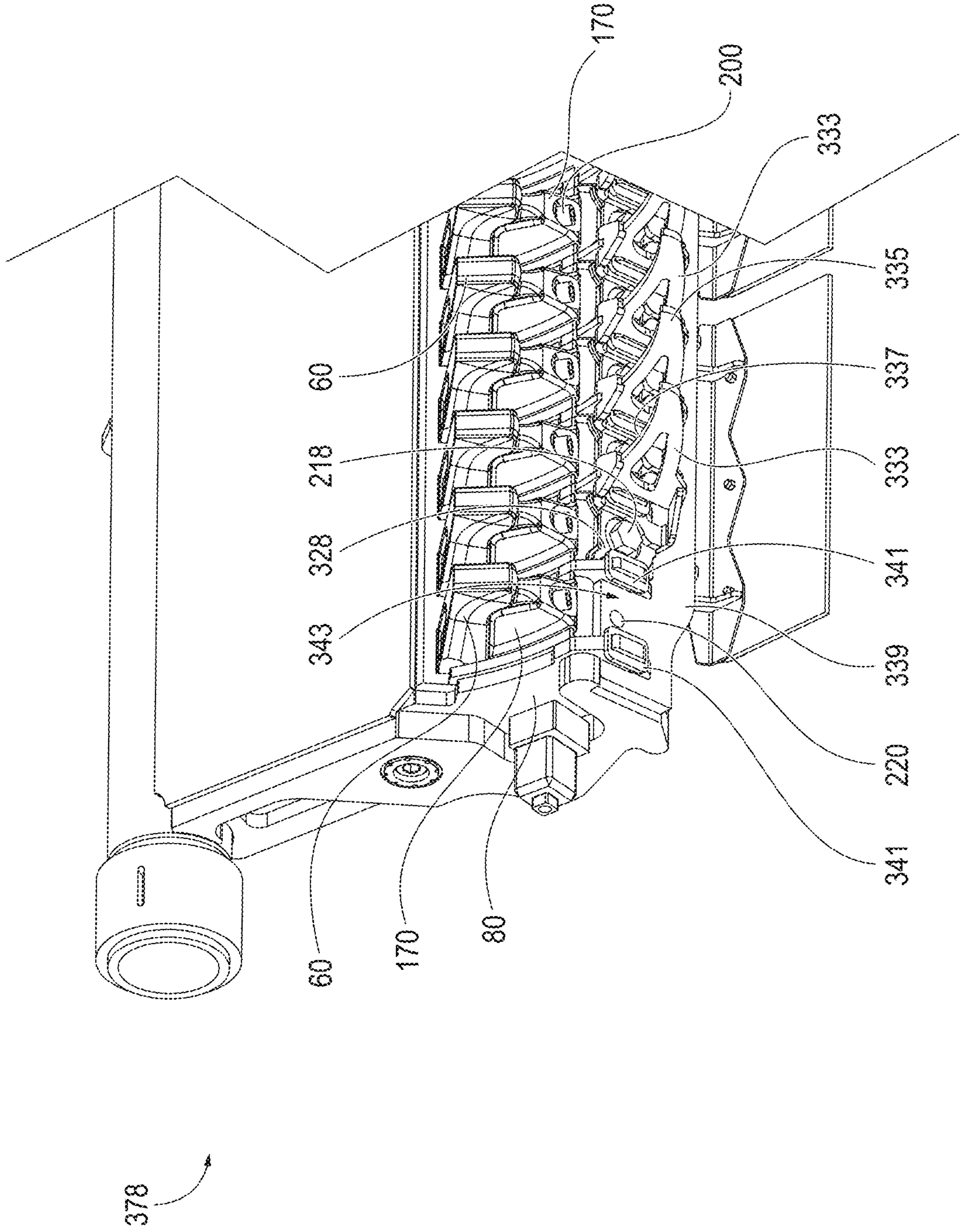
FIG. 27 is a perspective view of an end section of the comb unit of FIG. 26 having several components removed therefrom to better illustrate the underlying structure of the comb unit frame.
Figure 28:
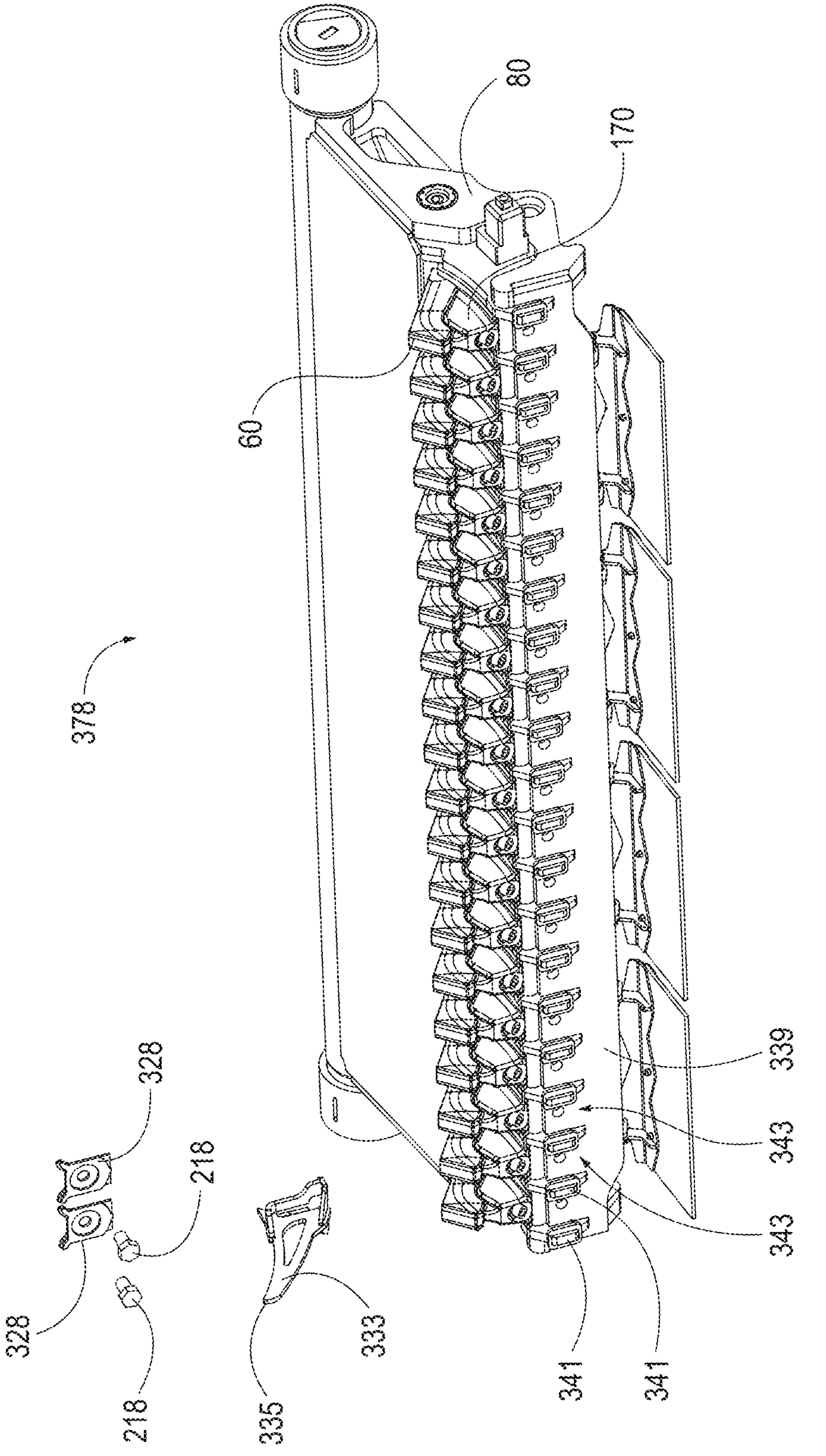
FIG. 28 is a perspective view of the comb unit of FIG. 26. The comb unit is shown with a single limiter, a pair of associated retainers, and a pair of associated fasteners exploded from the comb unit frame.
Figure 29:
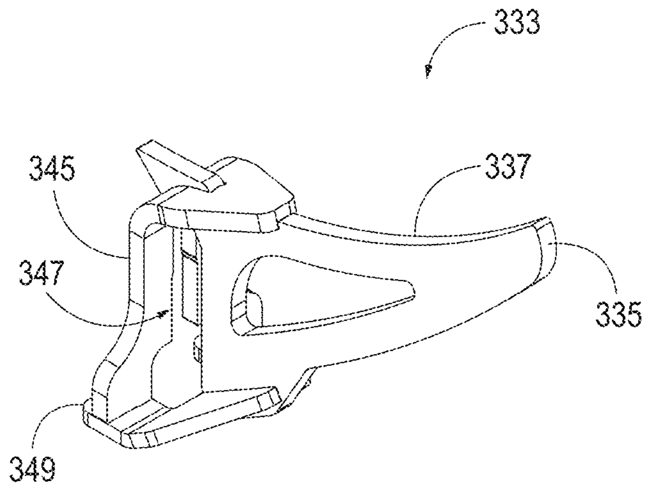
FIG. 29 is a perspective view of one of the limiters of the comb unit of FIG. 26.
Figure 30:
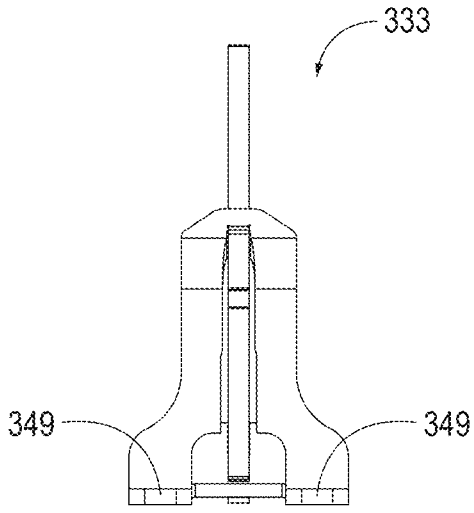
FIG. 30 is an end view of the limiter of FIG. 29, taken from the proximal end thereof.
Figure 31:
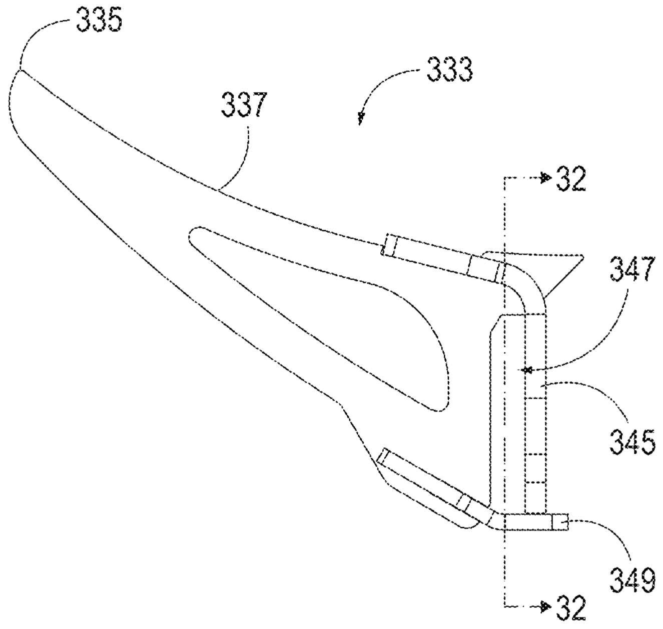
FIG. 31 is a side view of the limiter of FIG. 29.
Figure 32:
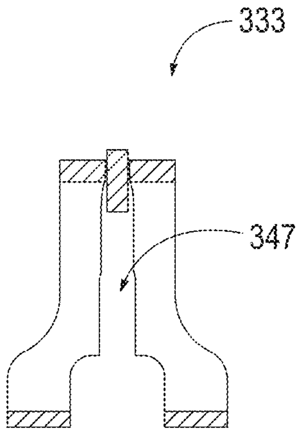
FIG. 32 is a cross-section view of the limiter, taken along line 32-32 of FIG. 31.

As shown in FIG. 27, the limiters 333 can extend predominantly in a longitudinal direction parallel to the longitudinal comb tooth axis B. The limiters 333 can be provided with a spacing distance therebetween, the spacing distance matching that of a spacing distance between comb teeth 60. However, the limiters 333 are not in-line with the comb teeth 60, but rather offset from the comb teeth 60 such that a given limiter 333 is equidistant from two nearest adjacent comb teeth 60. In the alternate embodiment of FIGS. 33 and 34, the limiters 433 are provided at the same spacing distance as the comb teeth 60 and are positioned in-line with the comb teeth 60. The limiters 333 can have a rotor-facing side or edge 337, which faces generally upward as the limiters 333 are mounted at a position below a portion of the rotor 38. The limiters 333 can have a claw or mild hook shape, with the rotor-facing edge 337 having a concave profile, the profile approximating or matching a contour curve traced at a fixed distance from the rotor axis 40 as will be appreciated from FIG. 26. Returning to FIG. 27, the frame 80, which may be a common frame to both comb units 78, 378 or unique to the comb unit 378, includes a support surface 339 having the threaded holes 220 for the fasteners 218. The support surface 339 can be flat or otherwise configured. Spaced from the support surface 339 are a plurality of flanged posts or bosses 341 configured to define slots or receptacles 343 therebetween. One hole 220 for one fastener 218 is located in each receptacle 343 as shown in FIG. 27.

Each retainer 328 is held in relation to the support surface 339 by a pair of laterally spaced slots formed by a pair of adjacent, spaced-apart flanged bosses 341, the pair of flanged bosses 341 having respective flanges extending toward each other. The receptacle 343 for the retainer 328 is formed between the two flanged bosses 341, and the respective flanges extend over the edge portions of the receptacle 343, this arrangement being repeated for each retainer 328. In addition, each one of the limiters 333 is mounted onto one, and in this case only one, of the flanged bosses 341. As described in further detail below, the limiter 333 is constructed to engage the two laterally opposed flanges on one flanged boss 341. Whereas the retainers 328 and the respective receptacles 343 are centered between adjacent flanged bosses 341, the limiters 333 are centered on the flanged bosses 341. The limiters 333, or portions thereof, can be stacked with the retainers 328 when assembled, which can be seen in FIG. 27. In FIG. 27, the two left-most flanged bosses 341 are shown without limiters 333 mounted. The left-most retainer slot is also shown with no retainer 328 and no fastener 218 to expose the threaded hole 220 and the support surface 339. In accordance with the above disclosure, each receptacle 343 can receive one retainer 328 (e.g., in its entirety) and portions (e.g., side edges) of two adjacent limiters 333.

With respect to FIGS. 29 to 32, one of the limiters 333 is shown in further detail. Although alternate constructions may be optional, the limiter 333 can be of one-piece construction, e.g., welded together from plate portions that are cut and/or bent into the desired shape. Opposite the distal tip 335, the limiter 333 has a proximal or attachment end 345 having a structure defined as an interface for mating with the shape of the flanged boss 341. The structure at the attachment end 345 can include a closed-end slot 347. The slot 347 is open at a lower side opposite the rotor-facing edge 337 and is closed at an upper side adjacent the rotor-facing edge 337. The slot 347 provides space that accommodates one of the flanged bosses 341 when assembled.

The limiters 333 and the retainers 328 can be assembled to the comb unit frame 80, respectively, by sliding onto the flanged bosses 341 or into the receptacles 343 in a direction parallel to the support surface 339. The limiters 333 are installed first, prior to installation of the fasteners 218. Once the limiter 333 is in place, the adjacent limiter retainer(s) 328 are slid into place between the support surface 339 and the limiter 333 and function to lock the limiter 333 in place (e.g., preventing sliding of the limiter 333 up out of slot) once the fastener 218 is installed (e.g., the fastener 218 being installed as described above to take play out of comb tooth base 170). For example, as labeled in FIGS. 29-31, a lip 349 protrudes outwardly on the proximal end of the limiter 333, generally opposite the portion forming the rotor-facing edge 337. In the assembly position, the bottom edge of the limiter retainer 328 contacts the lip 349 or is positioned directly in front of the lip 349 with respect to a direction parallel to the support surface 339 through the receptacle 343. Once the fastener 218 is installed, the head of the fastener 218 prevents the retainer 328 from sliding out of the receptacle 343. With the limiter lip 349 tucked under the bottom edge of the retainer 328, the retainer 328 prevents the limiter 333 sliding off the flanged boss 341. The lip 349 is positioned to catch on the retainer 328 in the event of an upward sliding force on the limiter 333, which might otherwise slide the limiter 333 out of position. As shown, each limiter 333 is provided with a lip 349 on each lateral side thereof, one for engaging each adjacent retainer 328. As mentioned above, the retainers 328 assemble after the limiters 333 and before the fasteners 218 due to the interference with the limiter lips 349. However, in another configuration, the comb unit 378 can be provided without the limiters 333 and with a plurality of retainers that function as anti-rotation clips for the fasteners 218, similar to the retainers 228 described above (e.g., FIG. 14).

Figure 33:
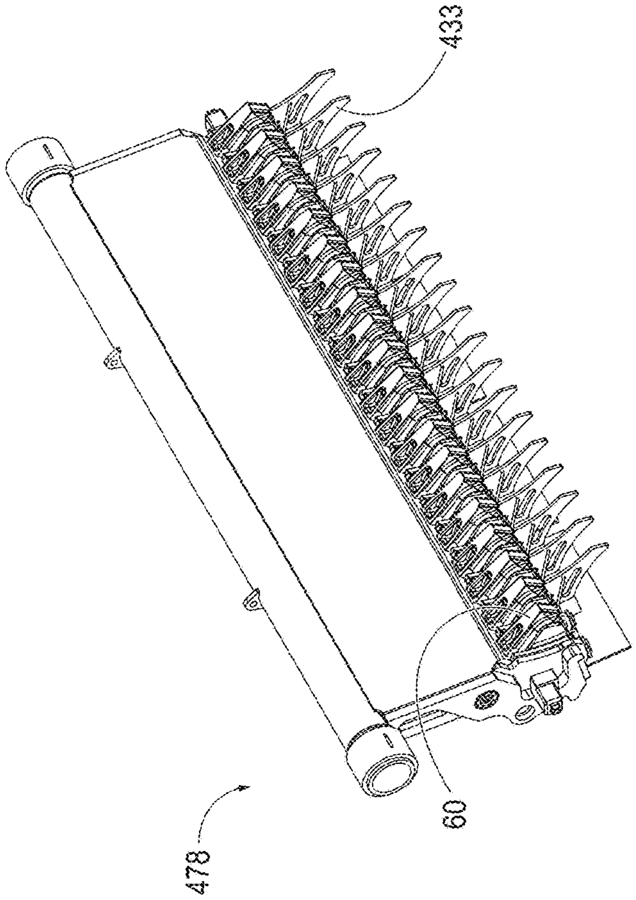
FIG. 33 is a perspective view of a comb unit of an alternate embodiment in which limiters are mounted to the comb unit frame in-line with the comb teeth.
Figure 34:
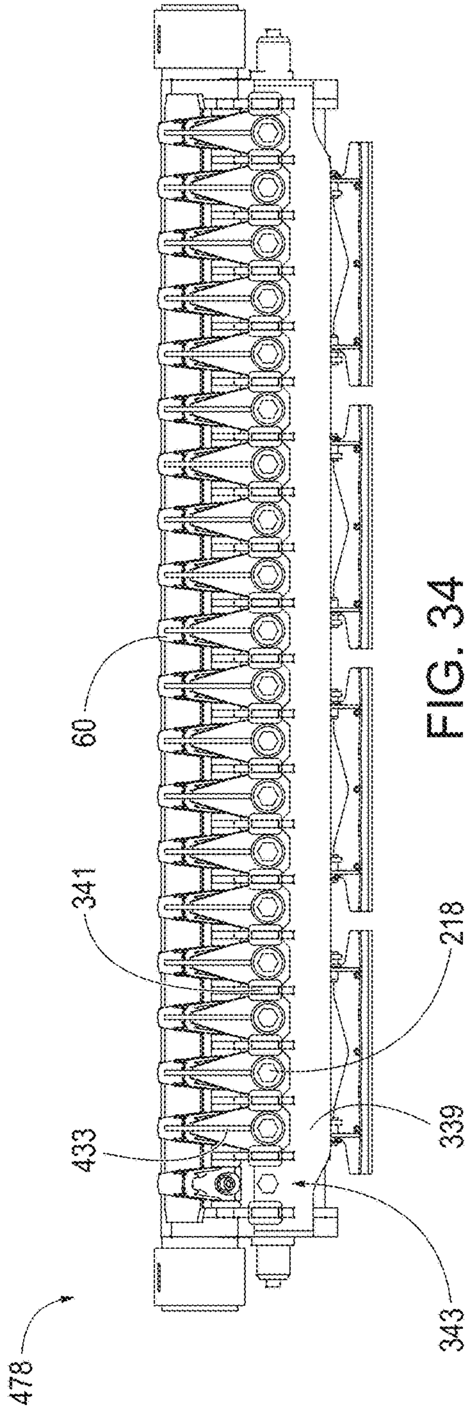
FIG. 34 is a bottom view of the comb unit of FIG. 33.

As mentioned briefly above, FIGS. 33 and 34 illustrate a shredder comb unit 478 that is similar to the comb units 78, 378, with the exception that limiters 433 are provided in positions that are directly under the respective comb teeth 60. To accomplish this arrangement, each limiter 433 is mounted in the receptacle 343 between two adjacent flanged bosses 341 on the support surface 339. The fasteners 218 can extend through an opening in the proximal portion of the limiters 433. Thus, the limiters 433 can be retained in the assembly position by the fasteners 218, without separate additional retainers, although alternate arrangements are optional.

Those skilled in the art will readily recognize various modifications and changes that may be made without following the example embodiments and applications illustrated and described herein, and without departing from the true spirit and scope of the inventive aspects disclosed herein.

What is claimed is:

1. A shredder comprising:

a shredder box;

a shredder rotor positioned within an interior of the shredder box, the shredder rotor being rotatable about a rotor axis and having a plurality of rotor teeth; and a shredder comb positioned at a side of the shredder box and including a plurality of shredder comb teeth configured to intermesh with the plurality of rotor teeth for shredding material input to the shredder box, and wherein the plurality of shredder comb teeth are removable and reversible for use in two orientations, and wherein each of the plurality of shredder comb teeth includes a first end having a cutting portion and a mounting pocket, and a second end having a cutting portion and a mounting pocket.

2. The shredder of claim 1, wherein the plurality of shredder comb teeth are fixedly supported on a comb unit frame through a corresponding plurality of comb tooth bases, which are removable from the comb unit frame.

3. The shredder of claim 2, wherein the entire shredder comb is supported by the comb unit frame, which is constructed as a single integral weldment.

4. The shredder of claim 2, wherein the plurality of comb tooth bases are positioned on an operative side of the comb unit frame.

5. The shredder of claim 2, wherein each of the plurality of comb tooth bases is positioned between the comb unit frame and the respective comb tooth.

6. The shredder of claim 2, wherein each of the plurality of shredder comb teeth is secured with a fastener to the corresponding one of the plurality of comb tooth bases.

7. The shredder of claim 6, wherein the fastener extends from an underside of the corresponding one of the comb tooth bases, through a clearance hole therein, and at least partially into a hole in the corresponding one of the plurality of shredder comb teeth.

8. The shredder of claim 1, wherein the cutting portion of the first end and the cutting portion of the second end are not only on opposite ends, but also opposite sides.

9. The shredder of claim 1, having a first configuration in which the first ends of the plurality of shredder comb teeth are mounted on a shredder comb frame to be positionable for intermesh with the plurality of rotor teeth, and the second ends of the plurality of shredder comb teeth are shielded from the shredder box interior by a comb unit frame.

10. The shredder of claim 1, having a first configuration in which the first ends of the plurality of shredder comb teeth are mounted on an operative side of a comb unit frame to be positionable for intermesh with the plurality of rotor teeth by fastening to a plurality of comb tooth bases, and the plurality of comb tooth bases are at least partially received into the respective first end mounting pockets.

11. The shredder of claim 10, wherein, in the first configuration, the second ends of the plurality of shredder comb teeth are mounted on a non-operative side of the comb unit frame, and the second ends contact a plurality of respective support rings, the support rings being at least partially received into the second end mounting pockets, without being fastened.

12. The shredder of claim 1, wherein the shredder comb is movable between a shredding position, in which the shredder comb teeth are positioned to intermesh with the rotor teeth, and a relief position, in which the shredder comb teeth are positioned outside a cylindrical reference boundary defined by the rotor teeth.

13. The shredder of claim 1, wherein a curved guide surface is formed in a comb unit frame as an installation slide for guiding a non-working end of each of the plurality of shredder comb teeth into a mounted position.

14. The shredder of claim 1, wherein the plurality of shredder comb teeth are fixedly supported on a comb unit frame, the comb unit frame having a support surface and a plurality of flanged bosses extending therefrom, the shredder further comprising a plurality of limiters mounted at the respective plurality of flanged bosses and projecting around a lower portion of the shredder rotor to close a throat space and promote recirculation of shredded material.

15. A shredder comprising:

a shredder box;

a shredder rotor positioned within an interior of the shredder box, the shredder rotor being rotatable about a rotor axis and having a plurality of rotor teeth; and a shredder comb unit positioned at a side of the shredder box and including a plurality of shredder comb teeth configured to intermesh with the plurality of rotor teeth for shredding material input to the shredder box;

wherein the shredder comb unit includes a frame on which the plurality of shredder comb teeth are fixedly supported through a corresponding plurality of comb tooth bases that are removable from the frame, and wherein the plurality of shredder comb teeth are removable and reversible for use in two orientations, and wherein each of the plurality of shredder comb teeth includes a first end having a cutting portion and a mounting pocket, and a second end having a cutting portion and a mounting pocket.

16. The shredder of claim 15, wherein each of the plurality of comb tooth bases is securely positioned with respect to the frame exclusively through a plurality of contact points with the comb tooth and the frame, without any direct fastening to the frame.

17. The shredder of claim 15, wherein for each of the plurality of comb tooth bases, a rounded knob of the frame is received into a complementary receptacle formed in the comb tooth base.

18. The shredder of claim 17, further comprising, for each of the plurality of comb tooth bases, a pushbolt threaded into the frame and configured to exert an adjustable pushing force onto a foot of the comb tooth base that is offset from the receptacle that receives the rounded knob.

19. The shredder of claim 15, wherein each of the plurality of shredder comb teeth is secured with a fastener to the corresponding one of the plurality of comb tooth bases.

20. The shredder of claim 19, wherein the fastener extends from an underside of the corresponding one of the comb tooth bases, through a clearance hole therein, and at least partially into a hole in the corresponding one of the plurality of shredder comb teeth.

21. The shredder of claim 15, wherein each of the plurality of shredder comb teeth is removable and reversible with respect to the plurality of comb tooth bases so as to provide two working orientations.

* * * * *